United States Patent

[11] 3,558,859

[72] Inventors Frederick W. Dilsner
Deerfield;
Aaron B. Aronson, Glenview; John E. Jones, Winnetka, Ill.
[21] Appl. No. 687,883
[22] Filed Dec. 4, 1967
[45] Patented Jan. 26, 1971
[73] Assignee Cummins-Chicago Corporation
Chicago, Ill.
a corporation of Illinois

[54] AUTOMATIC READING SYSTEM FOR RECORD MEDIA HAVING ENCODED DATA
15 Claims, 23 Drawing Figs.
[52] U.S. Cl. .................................................. 235/61.11, 235/61.12; 250/219
[51] Int. Cl. ..................................................... G01n 21/30, G06k 7/10, G06k 19/00
[50] Field of Search ........................................... 235/61.11, 61.115, 61.12; 250/219ID, IDC

[56] References Cited
UNITED STATES PATENTS
3,275,806 9/1966 Quinn et al. ................... 235/61.12
3,277,445 10/1966 Diamant et al. ............... 235/61.9

Primary Examiner—Maynard R. Wilbur
Assistant Examiner—Thomas J. Sloyan
Attorney—Wolfe, Hubbard, Leydig, Voit & Osann ABSTRACT: A data processing system for automatically reading characters represented by code indicia in prescribed fields on record media in any of a plurality of different codes. The illustrative system is designed to read any of three different perforated codes, including both legible and illegible codes, as well as three different printed or marked codes, such as the conventional bar code and marked code. The system includes a program panel which is used to select the prescribed fields in four different document formats. Then in response to the selection of a particular document format on the control panel, the reading system is automatically conditioned to read the correct codes in the prescribed fields. As the documents are transported through the reading system, photosensitive reading elements automatically respond to the selected codes in the prescribed fields to produce output signals representing the characters in response to the code indicia representing such characters.

PATENTED JAN 26 1971　　　　　　　　　　　　　3,558,859

READABLE CHARACTERS (R CODE)

INVENTORS
AARON B. ARONSON
FREDERICK W. DILSNER
JOHN E. JONES by: Wolfe, Hubbard, Voit & Osann
ATTYS.

FIG. 4 — READABLE CHARACTERS IN REVERSE (RR CODE): 1 2 3 4 5 6 7 8 9 0 ( + — ) sq.

FIG. 6 — IN-LINE CODE (IL): 1 2 3 4 5 6 7 8 9 0 ( + — ) sq.

FIG. 7 — MARKED CODE

DISTANCES OF PR READING HEAD CELLS PCL 1 - PCL 14 FROM TOP EDGE OF DOCUMENT

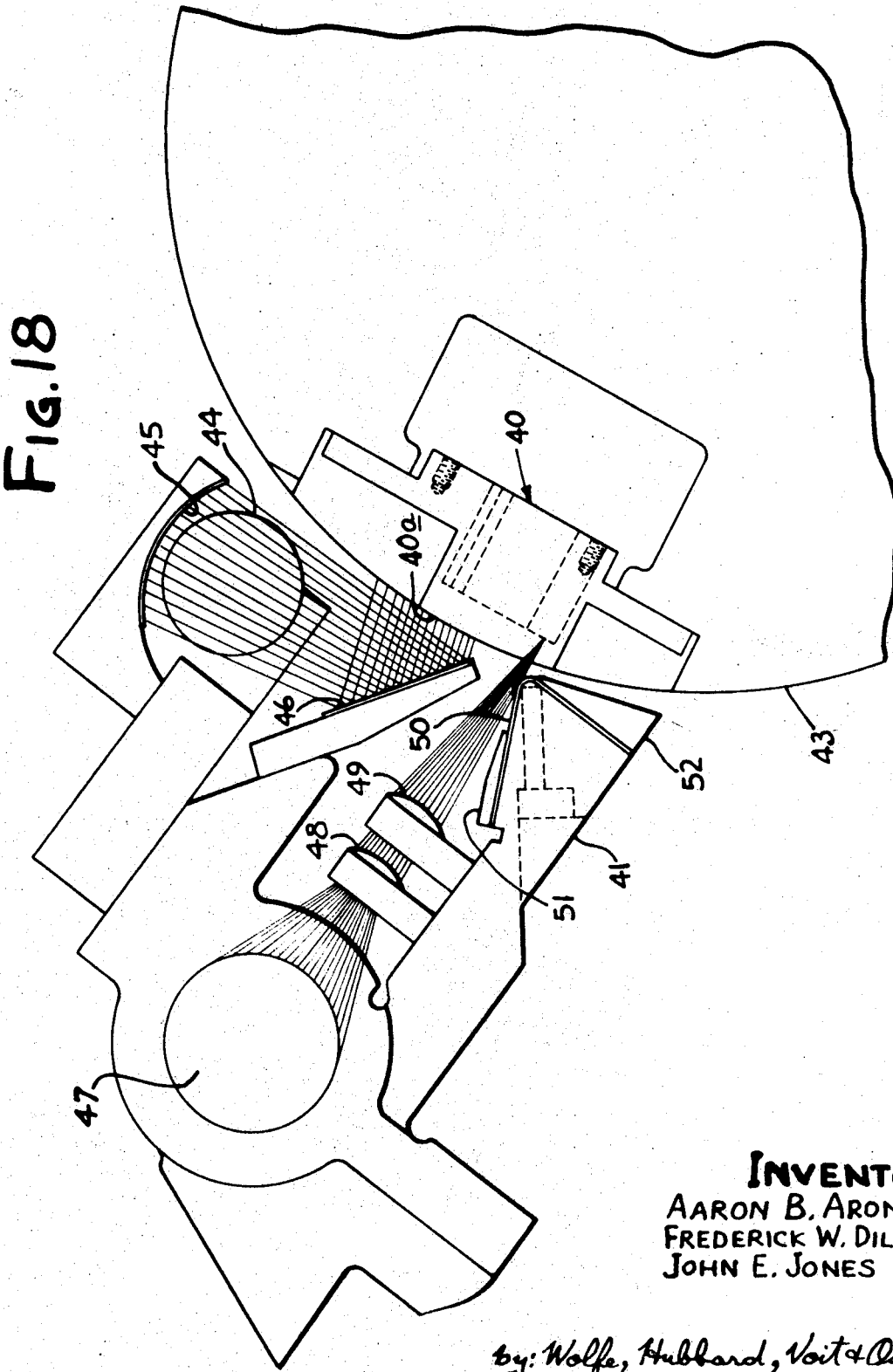

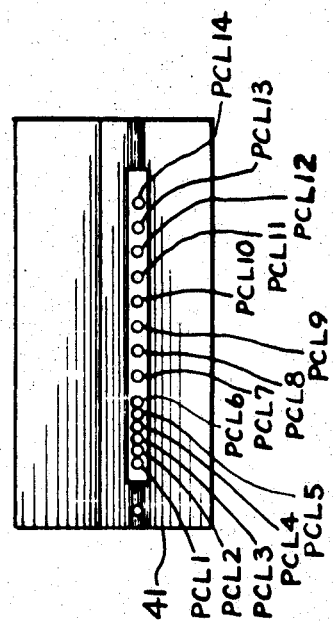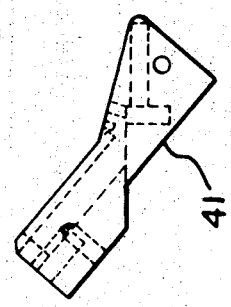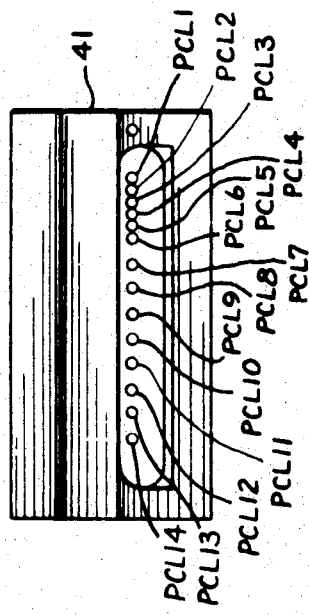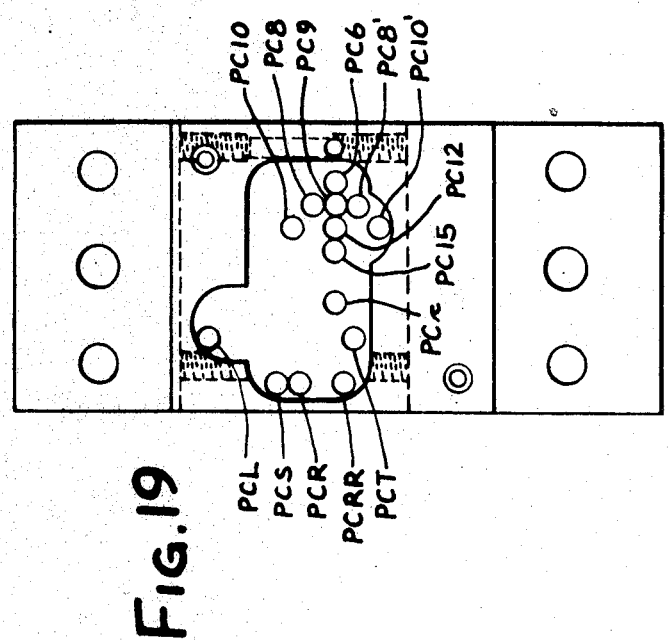

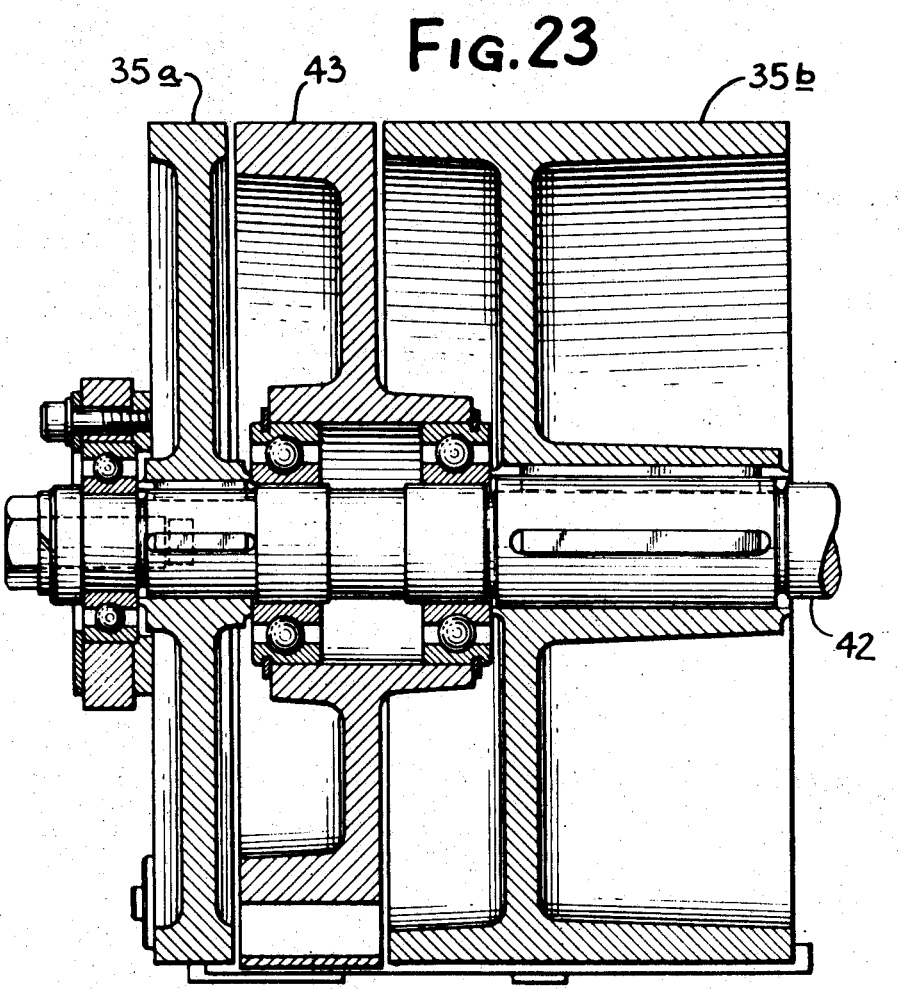

AUTOMATIC READING SYSTEM FOR RECORD MEDIA HAVING ENCODED DATA

The present invention relates generally to data processing systems and, more particularly, to an improved data processing system for reading characters represented by coded indicia on business documents or other record media.

It is a primary object of the present invention to provide an improved data processing system which permits characters in practically any desired code to be automatically read in a single pass through a single reading system. A related object of the invention is to provide such a system which permits characters in different perforated, printed and marked codes to be read in different fields on the same document in a single pass through the reading system.

It is another object of this invention to provide an automatic reading system of the foregoing type which can be programmed to read different selected codes in different selected fields in a number of different document formats, and which automatically reads the selected codes in the selected fields in response to the manual selection of a particular document format.

A further object of the invention is to provide such an improved reading system which is capable of automatically reading code indicia in different selected printing lines, as well as in different selected fields along the length of the document.

Still another object of the invention is to provide an improved reading system of the type described above which is compatible with auxiliary equipment such as automatic feeders, sorters, accumulators, and the like.

A still further object of the present invention is to provide such a data processing system which can be manufactured at a relatively low cost.

Other objects and advantages of the invention will become apparent as the following description proceeds, taken in conjunction with the accompanying drawings, in which:

FIG. 1 is an illustration of a typical document having characters represented by indicia thereon in several different codes;

FIG. 2 shows the representation of 12 exemplary characters in a plural line, readable perforated code;

FIG. 3 illustrates the significant locations of indicia stations in one character field for the code illustrated in FIG. 2;

FIG. 4 shows the representation of 15 exemplary characters in a plural line, readable reverse perforated code;

FIG. 5 illustrates the significant locations of indicia stations in one character field for the code illustrated in FIG. 4;

FIG. 6 shows the representation of 15 exemplary characters in an in-line perforated code;

FIG. 7 shows the representation of certain exemplary characters in the marked code;

FIG. 18 is a fragmentary and partially schematic end elevation of the reading heads associated with the transport drum illustrated in FIG. 9;

FIG. 19 is a front elevation of the face of the reading head for reading perforated codes in the reading system illustrated in FIGS. 9 through 18;

FIG. 20 is an end elevation of the reading head for reading printed and marked codes in the reading system illustrated in FIGS. 9 through 18;

FIG. 21 is a front elevation of the reading head of FIG. 20;

FIG. 22 is a rear elevation of the reading head of FIG. 20; and

FIG. 23 is a vertical section of a document transport drum and associated housing for the reading head of FIG. 19.

Figure 9:
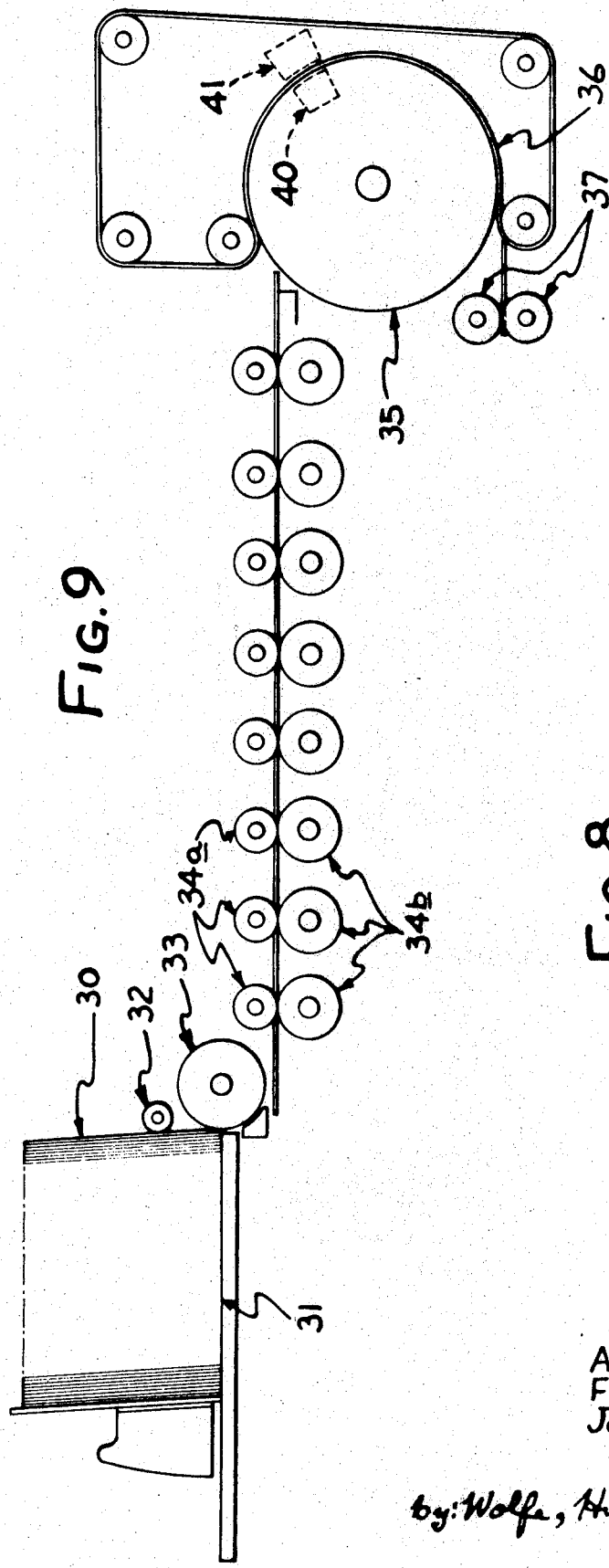
FIG. 9 is a diagrammatic illustration of a document transporting system for use with a photoelectric reading head assembly in an automatic reading system embodying this invention.

While the invention has been shown and will be described in some detail with reference to the particular embodiments thereof, there is no intention that it thus be limited to such detail. On the contrary, it is intended here to cover all alternatives, modifications, and equivalents falling within the spirit and scope of the invention as defined by the appended claims.

I. The Record Media And The Data Thereon

Referring now to FIG. 1, a typical data-bearing document is here illustrated in the form of a "labor ticket" of the type used to record operations performed along a production line. The left and top portions of the document contain indicia representing characters which are to be automatically read to create electrical signals representing input information for data processing apparatus, sorters, or other business machines. In the particular arrangement here illustrated, the indicia which represent certain of the characters also make those characters visibly legible or readable, and more specifically take the form of perforations applied selectively at different stations within rectangular matrix fields to represent various characters. The indicia which represent other characters are illegible, and are in the form of printed or marked indicia.

A first group 21 of characters applied to the labor ticket 20 represents the order number "1586," which is the number of the order for the particular product being made on the production line; the second group 22 of characters represents the item number "543210," signifying the particular item being produced; while the last group 23 of characters represents the quantity "1250" of the particular item signified by the group 22 for the particular order signified by group 21. The three groups 21—23 of numerical characters are visibly legible and can be read for checking purposes at a glance. Moreover, they constitute a permanent application of these numerical characters to the paper ticket, and the data represented by these characters will be the same for all the tickets in a given book or pad. The perforations therefor may be applied on a conventional perforating machine by punching the entire book or pad at one time.

The different operations to be performed along the production line are represented by characters represented by "bar code" indicia in an "operation number" code field 24 in the upper left-hand corner of the labor ticket 20. As each operation is completed, the particular operator who is responsible for that particular operation marks his own "clock number" in a "marked code" field 25. Both the bar code and the marked code will be described in more detail below, but it will be apparent from the illustration in FIG. 1 that both of these codes are illegible, i.e., the characters represented thereby cannot be read or understood by a layman who is not familiar with binary codes. Obviously a person who is familiar with binary codes could read numbers represented by code indicia in a binary form, but the format of the characters represented by such codes is still "illegible" in accordance with the meaning of that term as used herein.

After the encoding of data on the ticket 20 has been completed, the ticket is fed through automatic reading apparatus which produces electrical signals corresponding to the data represented thereon by the code indicia, and the resulting electric signals are fed into automatic data processing apparatus which performs the necessary computing and recording operations. To facilitate such processing of the ticket 20 by automatic reading apparatus, it is provided with a plurality of sprocket holes 26 arranged with uniform spacing in a row beneath the code fields 21—23. Each of the holes 26 is located with a predetermined spacing relative to one rectangular field occupied by one numerical character in the "readable" perforated code. As here shown, each hole 26 is disposed directly below the middle one of three vertical lines of perforations which make up the rectangular field containing the perforations for a given character in the code fields 21-23.

II. The "Readable" (R) Perforated Code

The characters visibly represented by patterns of perforations in the code fields 21—23 in FIG. 1 are located conventionally within a 3 × 6 station rectangular matrix. As indicated more clearly in FIG. 3, the field area 27 for receiving perforations to represent any one of a plurality of characters is rectangular in shape and has 18 possible stations (numbered as shown) located at the intersections of three vertical and six horizontal imaginary lines. In addition to the 18 stations thus formed within a given rectangular field, a 19th station is located in the third vertical line (on the right). This latter station is employed for parity checking purposes, and is here identified by the character c. By applying perforations selectively at different ones of the 19 stations (FIG. 3) within a 3 × 6 station matrix, any of the numerical characters 0—9, +, or − can be visibly represented. FIG. 2 shows the particular stations which receive perforations in order to represent such numerical characters.

In a 3 × 6 station matrix of the type shown in FIG. 3, and with characters visibly represented by the patterns of perforations shown in FIG. 3, and with characters visibly represented by the patterns of perforations shown in FIG. 2, four significant locations exist at stations 6, 8, 10 and 15, which are represented by circles in FIG. 3. For purposes of parity checking, the auxiliary station c is also made a significant location. That is, any of the numerical characters 0—9, +, or − contains perforations in a unique combination of perforations in the five significant locations. By identifying the combination of perforations in significant locations, the character itself can be identified. The "code" for this purpose, which will be referred to hereinafter as the "readable" or R perforated code, is made clear by FIG. 2. It will be seen that the numeral "1" contains perforations at significant locations 8 and c, and that none of the other characters of FIG. 2 contains perforations at these, and only these, significant locations. Such significant locations are represented, for clarity, in FIG. 2 by surrounding circles, and it will be understood that such circles are not actually applied to the business documents. In like manner, the character "2" contains perforations at significant locations 6 and c, and none of the other characters contains perforations at this particular combination of significant locations. The remaining combinations of significant locations which receive perforations as the other characters are applied within a field area will be apparent from an inspection of FIG. 2. Since the significant locations for the R code are necessarily in different vertical columns or "lines" to form portions of readable characters, the R code is a "plural line" code.

III. Other Types Of Perforated And Printed Codes

The "readable" (R) code described above and illustrated in FIGS. 1—3 is only one of the many different codes used on documents to be handled on automatic data processing equipment. For example, other perforated codes (referred to hereinafter generically as "PF" codes) in current usage are the "readable reverse" (RR) code, which is readable on the back of the document but which the machine reads in reverse from the face of the document (again a "plural-line" code), and the "in-line" (IL) code, which is a simple 5-level binary code using the same significant locations as the R code, but arranged in a single vertical line. In addition to the various perforated (PF) codes, there are various "printed" codes (referred to hereinafter generically as "PR" codes) in which the indicia are printed or marked on the surface of the document rather than perforated through the document. Examples of PR codes are the "marked" code used in field 25 in FIG. 1, in which a preprinted pattern not visible to the machine is overmarked with pencil or pen marks that are visible to the machine to denote one digit in each column, the conventional "bar" code used in field 24 in FIG. 1, and the 5-level computer printed (CPR) code described in copending application Ser. No. 687,572 entitled "Improved Method Of Encoding Data On Printed Record Media," filed Dec. 4, 1967, U.S. Pat. No. 3,541,960, and owned by a common assignee. While the present invention will be described in connection with an automatic reading system designed to read the six specific codes mentioned above, and to be described in more detail below, it will be understood that the invention is equally applicable to other codes, as well as other combinations of codes.

A. The "Readable Reverse" (RR) Perforated Code. The characters used in the RR code are illustrated by the examples in FIG. 4, from which it can be seen that the RR characters are simply the mirror images of the R characters described above. Consequently, the significant locations of the RR characters are the same as those described previously for the R characters, provided a reverse 3 × 6 rectangular station matrix, as illustrated in FIG. 5, is used. In both codes, the characters are conventionally spaced 0.3 inch center-to-center, and a space corresponding to one vertical line is provided between adjacent character fields, so the space between adjacent indicia columns within a character field is 0.075 inch center-to-center. The space between adjacent indicia rows, i.e., the vertical indicia spacing, is also 0.075 inch center-to-center.

B. The "In-Line" Perforated Code. In the IL code, the characters are represented by illegible, in-line coded perforations. As shown by the exemplary characters in FIG. 6, each in-line perforation filed consists of a single vertical row of perforation stations which preferably are located at levels 2, 3, 4, 5 and 7, of the readable code matrix. Each of these perforation stations is a significant location, i.e., the presence or absence of perforations in different combinations of $m$ levels (here $m=5$) of a single line can, according to a predetermined code, represent any one of a number of different characters. As shown in FIG. 6, the numerical character "1" is represented by perforations at levers 3 and 7 in a given line. The numerical characters "2" or "3" are represented by perforations at levels 2, 7 and 2, 3, 5, 7, respectively. The other combinations of perforation locations to represent different numerical characters will be evident from FIG. 6. Plus or minus symbols may also be represented by perforations in the locations shown. The spacing of the "in-line" indicia columns and rows, i.e., both the horizontal and vertical spacing, is 0.075 inch center-to-center.

It can be seen that the five levels of significant locations in legible R and RR code matrices correspond to the five levels of significant locations in a single-line code field. In other words, the significant locations for both the legible R and RR codes and the illegible IL code appear in the same five levels, namely levels 2, 3, 4, 5 and 7 of the matrices illustrated in FIGS. 3 and 5.

C. The "Marked" Code. The "marked" code, which is illustrated in FIG. 7, utilizes a preprinted pattern of readable characters which are not visible to the automatic reading system, but selected characters in the preprinted pattern are overmarked with pen or pencil marks 28 that are visible to the reading system. The vertical spacing of the preprinted digits is conventionally 0.166 inch center-to-center, while the center-to-center spacing of the columns is 0.3 inch. The vertical lines between adjacent columns of the preprinted digits indicate the horizontal center distance of the guide dots. When encoding, the pen or pencil mark is simply drawn diagonally through the selected character from one dot to the other, as illustrated in FIGS. 1 and 7.

Figure 8:
FIG. 8 shows the representation of 10 exemplary characters in the bar code.

D. The "Bar" Code. The "bar" code, which is illustrated in FIG. 8, is a 5-level binary code formed by bars that are conventionally 0.08 inch high and 0.04 inch wide. The vertical spacing is 0.08 inch center-to-center, so that when two bars are marked on adjacent levels, they actually form one solid bar 0.16 inch high. The horizontal spacing is usually 0.075 inch center-to-center. Each digit is formed by using two levels according to the following table:

|        |   |   |   |   | Digits |   |   |   |   |   |
|--------|---|---|---|---|--------|---|---|---|---|---|
|        | 1 | 2 | 3 | 4 | 5      | 6 | 7 | 8 | 9 | 0 |
| Value: |   |   |   |   |        |   |   |   |   |   |
| P      |   |   | x | x |        | x |   |   | x |   |
| 7      |   |   |   |   |        |   | x | x | x | x |
| 4      |   |   |   |   | x      | x | x |   |   | x |
| 2      |   | x | x |   |        | x |   |   |   |   |
| 1      | x |   | x |   | x      |   |   | x |   |   |

E. The "Computer Printed" (CPR) Code. The computer printed code, (referred to hereinafter as the "CPR" code) which is described in more detail in the copending application referred to above, is a 5-level binary code which is printed at the same time that uncoded informational data is printed on the document, by means of a high-speed computer printed for example. The vertical spacing within each column is usually 0.166 inch center-to-center, the horizontal spacing of the columns is 0.1 inch center-to-center, and each character is 0.1 inch high. All values are formed by printing either two or four characters in a column, according to the following table:

|        |   |   |   |   | Digits |   |   |   |   |   |
|--------|---|---|---|---|--------|---|---|---|---|---|
|        | 1 | 2 | 3 | 4 | 5      | 6 | 7 | 8 | 9 | 0 |
| Value: |   |   |   |   |        |   |   |   |   |   |
| 1      |   |   | 1 |   | 1      |   | 1 |   | 1 | 1 |
| 2      |   | 1 | 1 |   |        | 1 | 1 |   |   | 1 |
| 4      |   |   |   | 1 | 1      | 1 | 1 |   |   |   |
| 8      |   |   |   |   |        |   |   | 1 | 1 | 1 |
| P      |   | 1 | 1 |   | 1      |   |   | 1 | 1 |   |

IV. Mechanical Aspects Of An Illustrative Reading System

A. The Transporting System And General Arrangement Of The Reading Stations. For automatically reading the characters represented by the code or codes on a number of documents such as the ticket 20 shown in FIG. 1, a plurality or stack 30 of such documents are placed in the supply hopper 31 of a document transport system of the type diagrammatically illustrated in FIG. 9. These documents are fed one at a time from the magazine by a starting roller 32 and a feed roller 33 onto a transport having two sets of continuously moving rollers 34a, 34b which advance the documents lengthwise toward a continuously moving transport here shown as a rotating drum 35. As each documents engages the drum 35 and is carried by the latter through an arc, it is held firmly against the drum surface by means of tensioned, flexible, holddown straps 36. As the document is advanced to the lower side of the drum 35, it is engaged by a pair of rollers 37 and carried to a collecting hopper or sorter (not shown).

As each document is held in curved conformity to the surface of the drum 35, the code indicia thereon advance successively past a pair of reading heads 40, 41 each of which contains a plurality of indicia sensing elements, which here take the form of photosensitive elements or photocells. The drum 35 in the illustrative embodiment is formed in two parts 35a and 35b (FIG. 23), both of which are mounted on a common shaft 42 journaled in the machine frame. The two drum parts 35a, 35b are spaced apart in the axial direction so as to provide space for the first reading head 40 (for reading PF codes and thus referred to hereinafter as the "PF" reading head) mounted within a stationary housing 43 surrounding the shaft 42 (FIGS. 18 and 23). The drum parts 35a, 35b are located relative to the document transporting belts 36 such that the code fields of each documents pass over the space between the two parts 35a, 35b, i.e., directly over the PF reading head 40 mounted in the housing 43.

As a document is transported over the PF reading head 40, the code fields are illuminated by a light source 44 (FIG. 18) adjacent the outer surface thereof so that any perforated indicia on the document transmit light through the document to photoelectric sensing elements in the reading head 40. More particularly, the light source 44 in the form of an elongated lamp mounted parallel to the drum shaft 42 slightly above the PF reading head 40 and adjacent the periphery of the housing 43. A concave reflector plate 45 is mounted above the lamp 44 so that light emanating from the lamp is directed downwardly to a flat reflector plate 46 mounted at an angle of about 45° to the face of the PF reading head 40. Consequently, the light from the source 44 is reflected off the reflector plate 46 perpendicularly toward the face of the PF reading head 40, as illustrated schematically in FIG. 18. This light is normally blocked from the photoelectric sensing elements within the reading head 40 whenever a document passes between the reflector plate 46 and the reading head, but the perforated indicia in the documents selectively transmit the light through the document to selected photoelectric sensing elements corresponding to the indicia locations. The sensing elements, in turn, produce electrical output signals representing the encoded characters represented by the perforated indicia.

For reading the PR code indicia, the second reading head 41 (referred to hereinafter as the "PR" reading head) is mounted adjacent the outer surface of the housing 43 (FIG. 18) for cooperation with a second light source 47. Light from the source 47 is passed through a pair of focusing lenses 48, 49 which direct the light onto the outer surface of the code fields of a documents passing between the PR reading head 41 and the surface of the housing 43. This light is normally reflected from the document surface, except when it strikes the relatively dark areas formed by the PR code indicia. These dark areas are then sensed by the photoelectric sensing elements within the PR reading head 41, which respond by producing electrical output signals representing the encoded characters represented by the indicia printed or marked on the document.

For the purpose of improving the resolution of the light reflected to the various sensing elements in the PR reading head 41, a mask 50 is mounted on the face thereof via mounting bars 51, 52. The mask 50 is provided with apertures corresponding to the locations of the active ends of the photosensitive elements mounted within the reading head 41 to insure that each sensing element is responsive to only one particular indicia location.

B. The Reading Heads and Their Different Operative States. In accordance with the present invention, the two reading heads 40, 41 have a plurality of different operative states for responding to indicia in a number of different PF and PR codes. Thus, the PF reading head includes a first matrix of photoelectric sensing elements for responding to PF code indicia, the PR reading head includes a second matrix of photoelectric sensing elements for responding to PR code indicia, and each of the two matrices has a plurality of different operative states for responding to the respective indicia in different codes.

Turning first to the PF codes, the PF reading head includes a photocell matrix (FIG. 19) which corresponds substantially to a composite of the significant locations in the 3 × 6 matrices for the R and RR codes as shown in FIGS. 3 and 5, and the five in-line locations for the IL code indicia as shown in FIG. 6. More particularly, the face of the reading head is formed with openings communicating with the exposed, active ends of nine photocells PC6, PC8, PC9, PC8', PC10, PC12, PC10', PC15, and PCc located at positions corresponding to stations 6, 8, 9, 8', 10, 12, 10', 15, and c, respectively, in the matrices shown in FIGS. 3 and 5. Cell PC6 is located at level 2, cells PC8, PC9 and PC8' are located at level 3, cells PC10, PC12 and PC10' are located at level 4, cell PC15 is located at level 5, and cell PCc is located at level 7, with adjacent cells being spaced both horizontally and vertically by 0.075 inch center-to-center. Consequently, if a perforation field for a PF coded character in a document is placed in registry with the matrix field on the face of the PF reading head, then those particular photosensitive elements disposed at significant locations where perforations exist will receive light from the reflector 46 and will be correspondingly activated.

To read the three species of PF codes (R, RR and IL), particular combinations of the photocells in the PF reading head are enabled according to the significant locations of the indicia for the various codes. Thus, to read the RR code, cells PC6, PC8, PC10, PC15 and PCc are enabled. Similarly, to read the R code, cells PC6, PC8', PC10', PC15, and PCc are enabled. And, finally, to read the IL code, cells PC6, PC9, PC12, PC15 and PCc are enabled.

In addition to those photosensitive elements previously noted, the PF reading head includes a document sensing photocell PCL (FIG. 19), for sensing the leading edge of each document passing over the reading head, and an end-of-document photocell PCT for sensing the trailing edge of each document passing over the reading head. These two photocells PCL and PCT do not sense the presence or absence of perforations within the record medium, since they are located outside the PF code fields, e.g., fields 21—23 in FIG. 1, of the document, but are simply masked from the light from lamp 44 and reflector 46 whenever a document is passing in front of the reading head.

In order to determine precisely those instants at which each perforation field is in registry with the photosensitive elements which are to detect the presence or absence of perforations at different stations, two synchronizing photocells PCR and PCRR (FIG. 19) are also included in the PF reading head. Both of the cells PCR and PCRR are located so as to be aligned with the sprocket holes 26 of the document passing thereover. Since the sprocket holes 26 are spaced apart by the same distances as the individual R or RR code character fields, and are aligned with the centers of those fields, the synchronizing cells PCR and PCRR are activated only when one of the character fields is in registry with the photosensitive elements in the R or RR code reading matrix. In the illustrative reading head, the synchronizing cells PCR and PCRR are slightly offset from the centers of the respective matrices of photocells for reading the R code and the RR code, respectively, so as to produce signals in response to the passage of the trailing edge of each sprocket hole 26 thereover, for reasons to be discussed in more detail below. It can be seen that if the status or condition (lighted or unlighted) of a certain combination of the photosensitive elements within the PF reading head is determined at those instants when the trailing edge of a sprocket hole passes over one of the synchronizing cells PCR or PCRR, the combination of perforations in the significant locations of a code character will be sensed.

For the purpose of tracking the progressive movement of each document around the drum 35, so that the particular portion of the document present at the reading head is known at all times, a sprocket counting photocell PCS (FIG. 19) is also included in the reading head. As in the case of the synchronizing photocells PCR and PCRR, the sprocket counting cell PCS is located so as to be in precise alignment with the sprocket holes 26 of the document passing over the reading head. Consequently, the cell PCS produces an output signal each time a sprocket hole 26 passes thereover, and these output signals are counted to keep track of the progress of the document passing over the reading head in terms of the number of sprocket spaces counted from the leading edge of the document, as will be described in more detail below.

Figure 17:
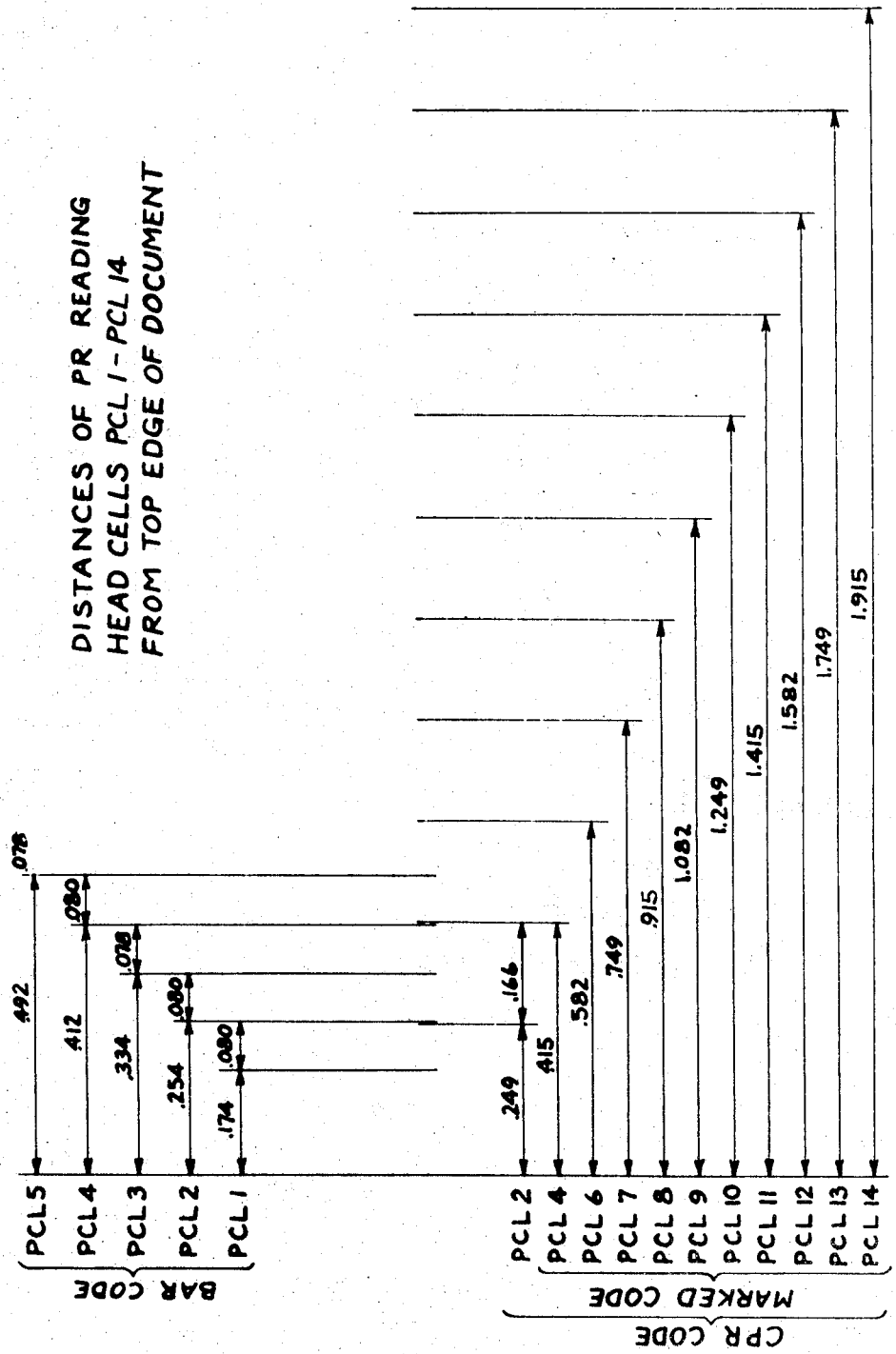
FIG. 17 is a chart illustrating the relative locations of the various indicia for the three different types of printed and marked codes to be read in the reading system of the invention.

Turning now to the PR codes, the face of the PR reading head 41 (FIGS. 20—22) contains a single line of photoelectric sensing elements PCL1—PCL11 arranged along an axis extending transversely to the direction of movement of the indicia-bearing document, and corresponding to 11 significant locations of the indicia in the bar code (FIG. 8), the marked code (FIG. 7), and the CPR code described previously. The first five cells PCL1—PCL5 are located at approximately the same locations as the five indicia locations of the bar code, i.e., the cell PCL1 is 0.174 inch from the top edge of the document being read, and adjacent cells are spaced apart by about 0.08 inch center-to-center. As can be seen in FIG. 17, which is a chart showing the dimensional relationships of the various indicia of the bar code, the marked code, and the CPR code, and the corresponding photocells PCL1—PCL11, the second and fourth indicia locations in the bar code are approximately the same as the first and second indicia locations in the CPR code. Moreover, the first indicia location in the marked code is the same as the second indicia location in the CPR code and, therefore, approximately the same as the fourth indicia location in the bar code. Consequently, cell PCL2 can be used to read both the indicia in the bar code and the first indicia in the CPR code, and cell PCL4 can be used to read the fourth indicia in the bar code, the second indicia in the CPR code, and the second indicia in the marked code, as graphically illustrated in FIG. 17.

In order to position the shared photocell PCL4 midway between the precise locations of the level-4 indicia in the bar code and the level-2 indicia for the CPR and marked codes, cell PCL4 is spaced from cell PCL3 by only 0.078 inch rather than the conventional bar code spacing of 0.08 inch.

As can be seen from the chart in FIG. 17, the spacing of the indicia for the marked code is the same as that for the CPR code, namely 0.166 inch center-to-center. Consequently, the same cells which are to sense the indicia of the CPR code will also sense the indicia of the marked code. The only difference is that the indicia for the CPR code may appear on any five of eleven printing lines, while the marked code indicia always appear on the same 10 lines. The preprinted digit zero in the preprinted pattern for the marked code, normally appears on the third printing line from the top of the document, while the second through the 12th printing lines are utilized for the CPR code. Thus, it can be seen that cells PCL2, PCL4, and PCL6 through PCL14 are used to read the CPR code indicia, while cells PCL4 and PCL6 through PCL14 are used to read the marked code indicia.

V. Programming and Control System

A. In General. In keeping with the present invention, an automatic control system is operatively connected to the dual reading heads for automatically actuating the reading heads in selected operative states for reading different codes in selected prescribed fields on the record media transported past the reading heads. Thus, in the illustrative reading system illustrated in FIGS. 10—16, a few simple connections on a program panel adapted to be inserted into the reading system, condition the reading system to automatically read different selected codes in different selected fields in different document formats; a first connection on the program panel automatically selects the particular cells needed to read the selected code, while other connections on the same panel select the particular fields in which the selected code is to be read. For example, the program panel illustrated in FIG. 10 may be used to select any of the six PF and PR codes described previously, and the particular fields in which each selected code is to be read. As another feature of the invention, the reading system may be programmed to read any of four different document formats by use of a single program panel. Thus, after one such program panel has been inserted into the machine, the selection of a particular document format, which may be done either automatically or manually, automatically conditions the system to read a selected one of the four document formats for which the machine has been programmed. In the illustrative system, the operator manually selects a particular document format by simply pressing one of four "document selector" buttons DS1—DS4, conveniently located on the control panel (not shown). Alternatively, the record media could be provided with prefix indicia to automatically signal that a selected document format is to be read, thereby automatically conditioning the system to read the programmed codes for that particular format.

Figure 10:
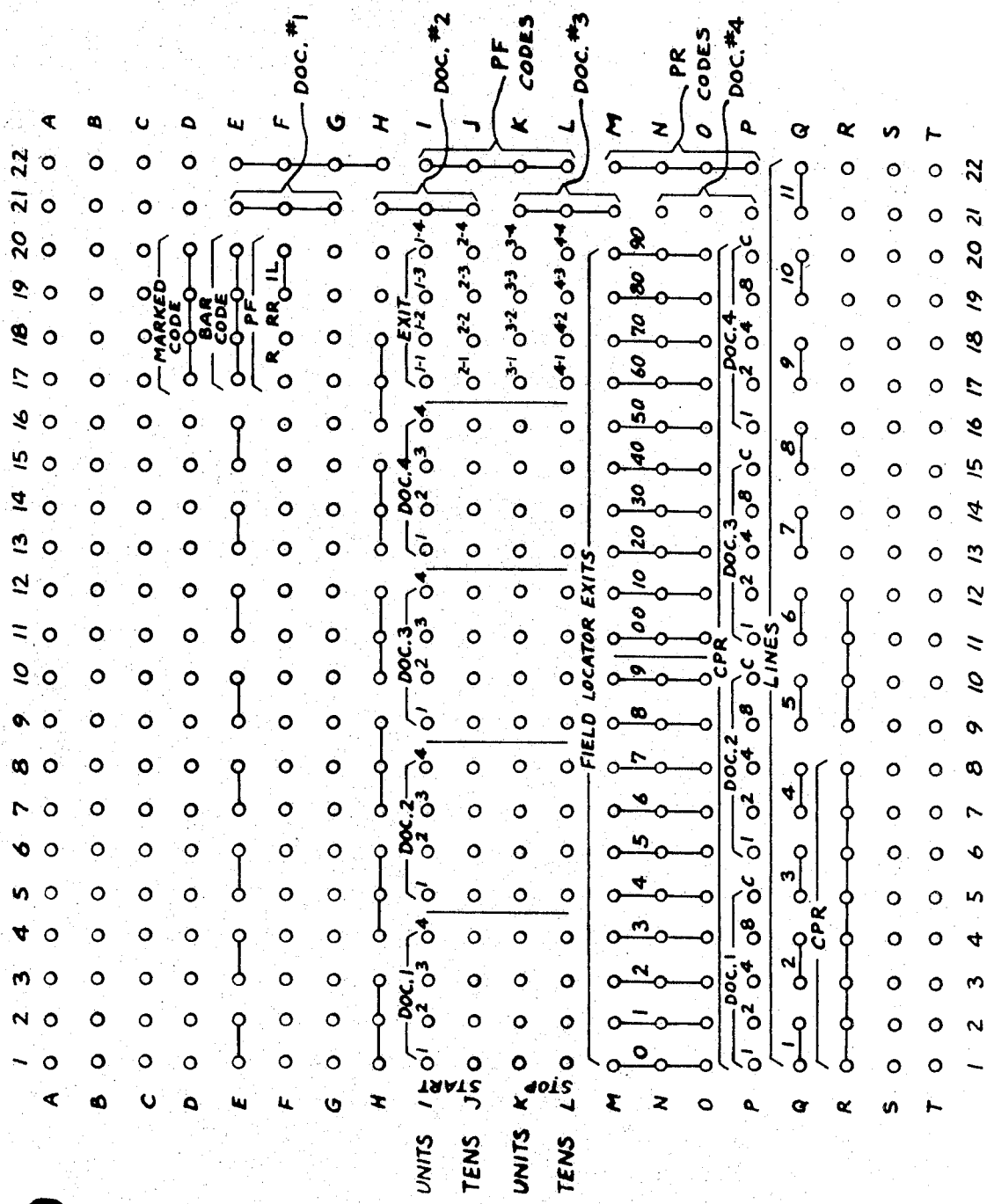
FIG. 10 is a plan view of an exemplary program panel for use in the reading system of this invention.

Referring now to the exemplary program panel in FIG. 10, the operation of the illustrative system can be most easily understood by reference to particular examples. To further facilitate an understanding of the illustrative system, the various terminals on the exemplary program panel will be identified by the column numbers 1 through 22 and the row letters A through T marked around the periphery of the panel. Thus, A,1 will designate the first terminal in row A; A—B, 1—2 will designate the cluster of four terminals comprising the first two terminals (columns 1 and 2) in each of the two rows A and B; E—G, 20—22 will designate the cluster of nine terminals comprising the last three terminals (columns 20, 21, and 22) of each of rows E, F, and G; and so on.

Figure 11:
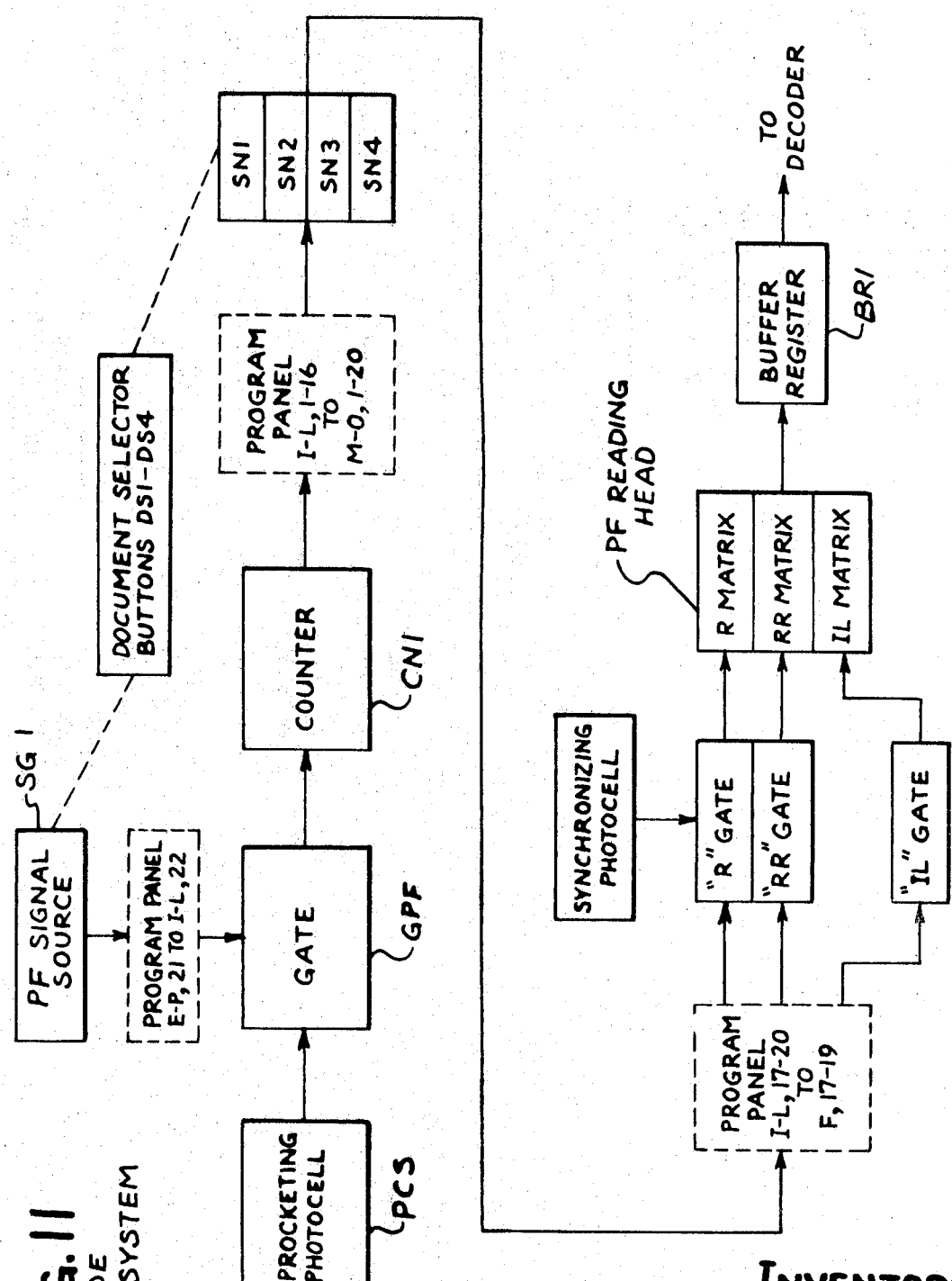
FIG. 11 is a diagrammatic block and line diagram of the electrical components utilized to read perforated codes in the reading system of the invention.

B. Programming and Reading PF Codes—FIGS. 10 and 11. Assuming for the moment that the first document for which the machine is to be programmed has only PF codes to be read, one of the interconnected terminals E—G, 21, representing the first document to be programmed on this particular panel, is connected to one of the interconnected terminals I—L, 22, representing the PF codes generically. Referring to FIG. 11, this connection causes a PF signal to be supplied from a PF signal source SG1 to a gate GPF whenever the first document selector button DS1 on the control panel CP1 is depressed, thereby opening the gate GPF to pass signals from the sprocket counting photocell PCS to a counter CN1. As mentioned previously, the sprocket counting photocell PCS is in alignment with the document sprocket counting photocell PCS to a counter CN1. As mentioned previously, the sprocket counting photocell PCS is in alignment with the document sprocket holes 26 so that output signals from the photocell PCS are produced in response to the passage of the sprocket holes 26 thereover as the document progresses around the surface of the drum 35. These signals are counted by the counter CN1 so as to track the progress of the document around the drum surface by increments corresponding to the spacing between the sprocket holes 26, which in turn correspond to the spacing of the PF characters (0.3 inch center-to-center in the example given previously). Accordingly, at any given time the machine knows the exact position of the document on the drum surface, in terms of the number of sprocket holes which have passed over the sprocket counting photocell PCS.

In order to select the first field in which the PF code is to be read, "units" and "tens" terminals I—J, 1, representing the start of the first field on the first document, and "units" and "tens" terminals K—L, 1, representing the end of the first field on the first document, are connected to selected ones of terminals M—O, 1—20, representing the number of sprocket holes counted by the counter CN1. In other words, the beginning and end of the field to be read are defined in terms of the number of sprocket holes or spaces from the leading edge of the document so that the counter output can be used to locate the two limits of the field as the document progresses around the drum. For example, if the first field on the first document is to begin one sprocket space from the leading edge of the document, and end nine spaces from the leading edge, the "units" terminals I, 1 for the start of the first field on the first document is connected to terminal M, 2, representing a units count of 1, and the corresponding "tens" terminal J, 1 is connected to terminal M, 11 representing a tens count of 0. Similarly, the "units" terminal K, 1 for the end of the selected field is connected to the terminal M, 10, representing a units count of 9, while the corresponding "tens" terminal L, 1 is connected to terminal N, 11, representing a tens count of 0. These connections program the machine to automatically actuate the reading head between sprocket holes 1 and 9 as counted by the counter in response to signals from the sprocketing photocell PCS.

Although it is necessary to have one sprocket hole 26 for each PF character to be read, it will be appreciated that the sprocket holes need not continue along the entire length of the document, since they are not used to transport the document. In the labor ticket illustrated in FIG. 1, for example, the sprocket holes 26 are coextensive with only the PF code fields 21—23, and do not extend through the PR code fields 24 and 25.

Returning to FIG. 11, the field definition connections on the program panel cause selected output signals from the counter CN1 to be applied to one of a plurality of switching networks SN1 through SN4 corresponding to four documents programmed on any given panel. In the particular example given above, the defined field was for the first document, so the described program panel connections would couple the selected counter outputs to the first switching network SN1. Whenever the first document selector button DS1 is depressed, switching network SN1 is enabled so as to condition the reading head to read the particular field or fields selected for the first document.

The connections described thus far program the machine to read a PF code in a first prescribed field on a first document. But it will be recalled that the illustrative machine is designed to read any of three different PF codes, namely R, RR, and IL, and thus it is necessary to condition the reading head to read only the particular species of PF code to be used in the prescribed field. For this purpose, one of the three PF terminals F, 17—19, representing the specific codes R, RR, and IL, respectively, is connected to a field 1, document 1 exit terminal 1, 17. For example, if the species of PF code to be read in field 1, document 1 is the R code, the R terminal F, 17 is connected to the field exit terminal 1, 17. Referring to FIG. 11, this connection would cause the switching network SN1 to be coupled to an R gate, thereby opening the R gate in the interval between the counter output signals selected to define the first field. The opening of the R gate permits only the R code matrix of reading cells in the reading head to be enabled during the field 1 reading interval. More particularly, the R gate permits only photocells PC6, PC8, PC10, PC15, and PCc to be enabled, since these are the five cells corresponding to the five significant positions of the R code indicia. As described previously, cells PC6, PC15, and PCc are common to all the PF codes, and thus these three cells are enabled whenever any of the three PF codes R, RR, or IL is selected. When the R code is selected, as in the example given above, cells PC8 and PC10 are also enabled to complete the reading matrix.

In order to detect and signal when each individual character field within the selected R code field is in full registry with the enabled matrix of photocells for reading the R code, the synchronizing photocell PCR is included in the reading head in alignment with the sprocket holes 26 of the document. As mentioned previously, the cell PCR in the illustrative reading head, is offset from the center line of the R code matrix by a distance equal to the radius of one sprocket hole, and the output signal utilized from the cell PCR is that produced at the trailing edge of the sprocket hole, which is usually sharper than the leading edge of the same hole. As illustrated schematically in FIG. 11, the output signals produced by the sprocket synchronizing cell PCR are passed through the R gate, which was previously opened by the output from switching network SN1, to enable the R matrix of reading cells PC6, PC8, PC10, PC15 and PCc just as each individual character field advances past the reading matrix, the reading matrix is disabled until the next sprocket hole 26 arrives at the cell PCR. Thus, it can be seen that the signals from the switching network SN1 determine the particular sprocket spaces between which the fields are to be read, while the signals from the sprocket synchronizing cell PCR determine the precise reading time for each character within the defined field.

While the reading cells in the selected code matrix are enabled, they produce a combination of output signals corresponding to the perforation pattern occurring in the particular character field being read. These output signals from the reading photocells are fed into a buffer register BR1 which serves as an intermediate storage means to store the signals from the photocells for application to a suitable decoding device (not shown).

Figure 12:
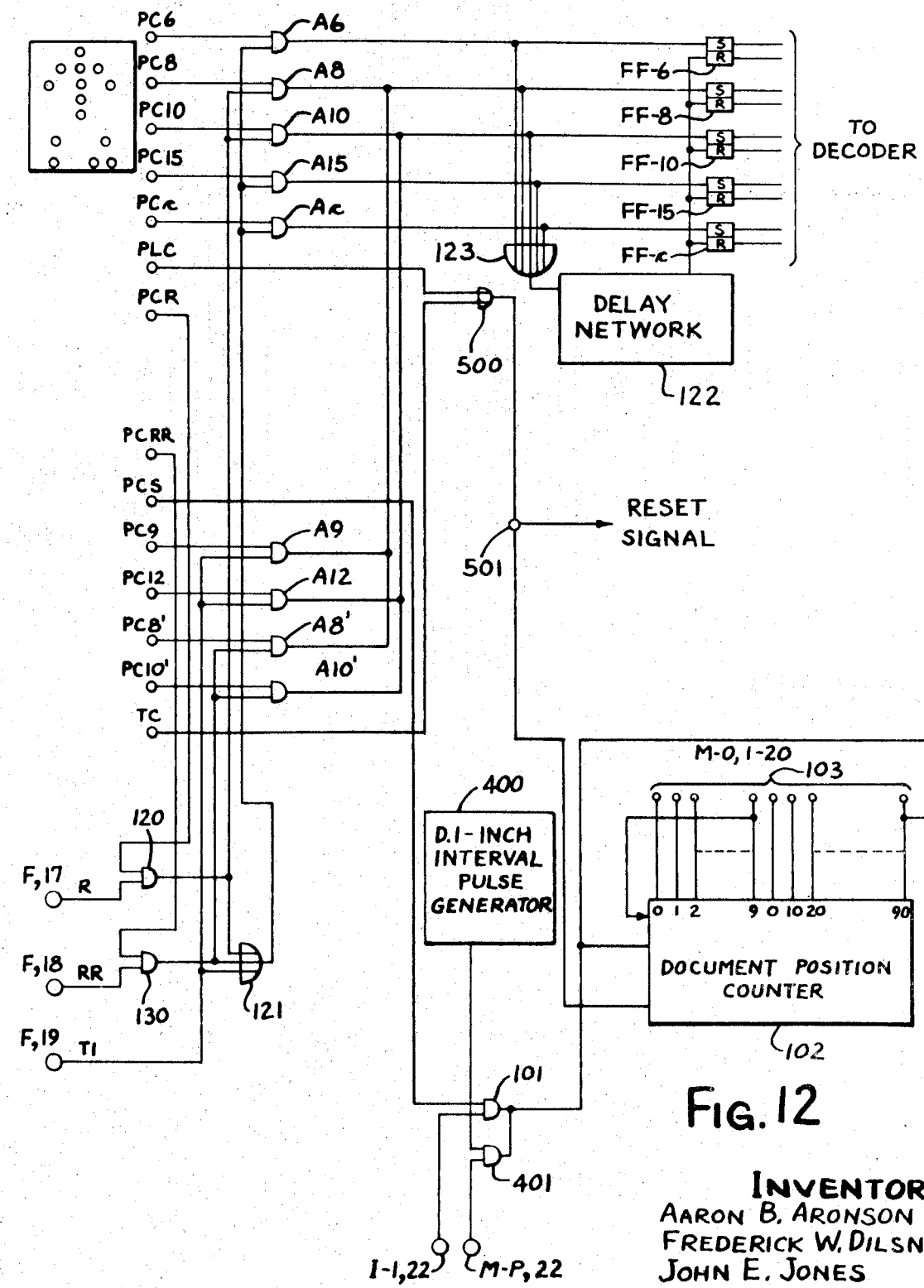
FIG. 12 is a detailed block diagram of certain of the components shown in FIG. 11.
Figure 13:
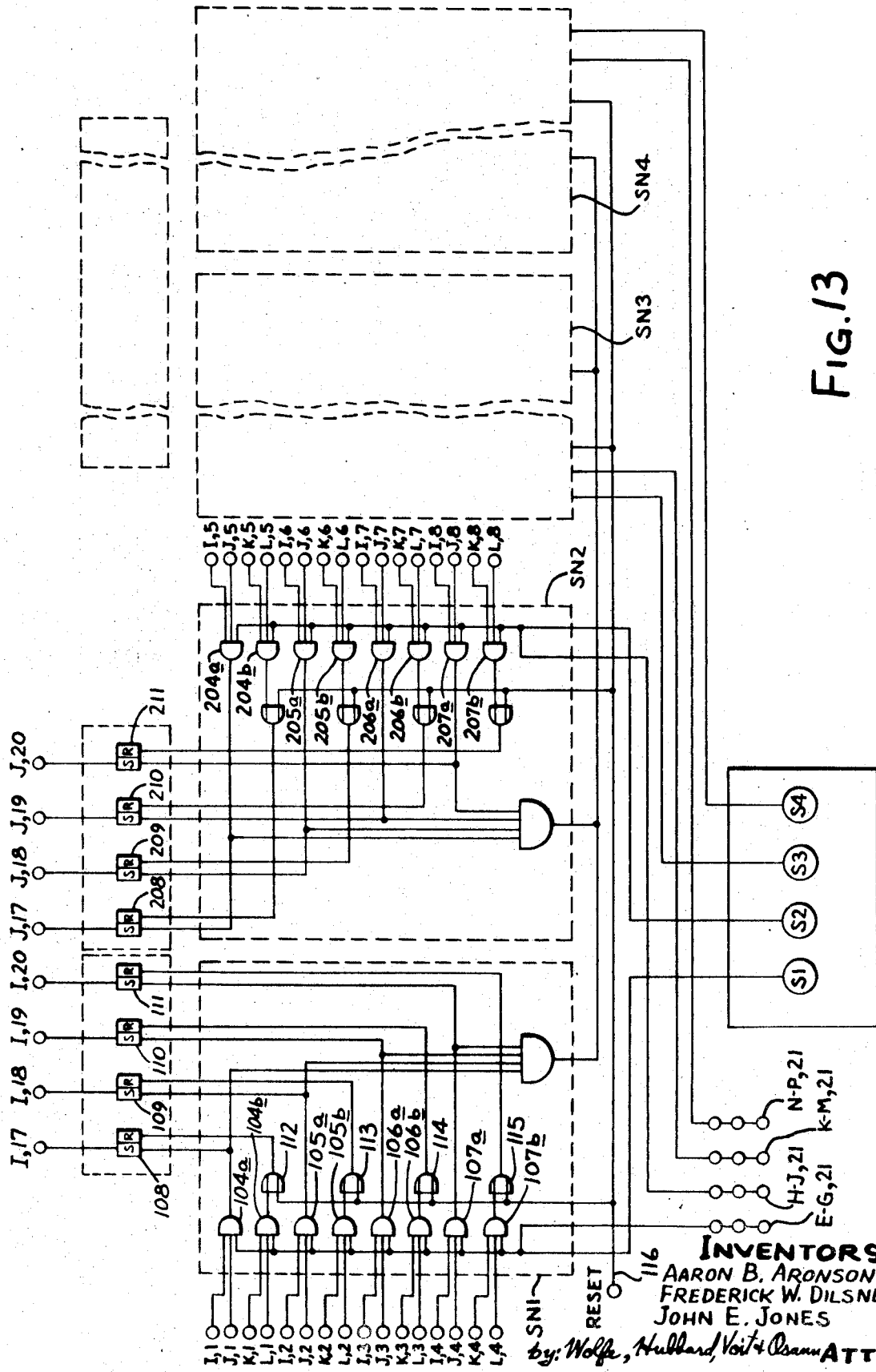
FIG. 13 is a detailed block diagram of certain other components shown in FIG. 11.

C. Detailed Description of an Exemplary PF Code Reading System—FIGS. 12 and 13. In FIGS. 12 and 13, there is illustrated a preferred, detailed embodiment of the system previously described and illustrated in block diagram form in FIG. 11, although it will be understood that the system of FIG. 11 may take a variety of forms. Referring first to FIG. 12, signals produced by the sprocket counting photocell PCS in response to the passage of the sprocket holes 26 in the document being read, are fed through an AND gate 101 to a document position counter 102, which in this case functions as a sprocket space counter. Since AND gates are well known to those skilled in the art, they will not be described herein in detail. Rather, AND gates will be illustrated symbolically by the particular symbol utilized to represent the gate 101 in FIG. 12. It will be understood that an AND gate produces a predetermined output signal only when all the input signals are present.

The circuitry for producing the desired output signals for actuating the counter 102 in response to the passage of perforations past the photocell PCS is conventional and need not be detailed herein. For example, the photocell may be of the variable resistance type which normally has a relatively high resistance which decreases when the cell is exposed to light. This variable resistance type of photocell is typically connected as part of a voltage dividing circuit across a direct voltage source so that each time light falls momentarily upon the photocell, e.g., during registration of a sprocket hole with the photocell on one side of the document and the light source on the other side of the document, the resistance of the photocell decreases thereby producing a voltage pulse.

Assuming that only the program panel connections described previously have been made, the AND gate 101 will not pass the signals from the sprocket counting cell PCS until the operator has depressed the document selector button DS1 so as to close a switch S1 (FIG. 13). The closing of the switch S1 applies a PF signal to the gate 101, thereby opening the gate to pass the sprocket counting signals from the cell PCS to the counter 102. As long as the AND gate 101 is maintained open by the presence of the PF signal, i.e., as long as the switch S1 remains closed, the counter 102 continues to count the sprocketing signals so that the count stored therein at any given time represents the number of sprocket holes 26 that have passed the sprocket counting cell PCS, starting at the leading edge of the document to be read.

The counter 102 is preferably a conventional cascade arrangement of two decade ring counters in which the first counter counts repetitively from 1 to 10 (units counter), while the second counter counts the numbers of 10 counts completed by the first counter (tens counter). The units counter produces successive output signals at the first 10 output terminals 103 designated "0, 1, 2, . . . 9," in FIG. 12, while the tens counter produces successive output signals at the second 10 output terminals 103 designed "0, 10, 20, . . . 90," so that the combination of the units output and the tens output at any given time may represent any number from 1 to 99.

More particularly, as the units counter counts from 1 to 10, output signals are produced successively at each of the first 10 terminals 103 as indicated by the numerals thereon in FIG. 12. On the 10 count, an output signal is produced on the 11 terminal, designated by numeral 10, and this signal remains on the 10 terminal while the counter repeats the 10 count to again produce successive output signals on each of the first nine terminals. On the 12 pulse, the output signal is removed from the 10 terminal and applied to the 20 terminal while the 10 count is again repeated. Consequently, it can be seen that an output signal corresponding to any stored number between 0 and 99 can be obtained from the counter by simply tapping one of the units terminals 0 through 9 and one of the tens terminals 0 through 90. The electrical signals representing the selected numbers are then used to define the selected field in terms of sprocket spaces.

Each time a selected pair of counter output signals appears at the counter terminals 103, they are applied via the program panel connections (I—L, 1—16 to M—O, 1—20) to a selected pair of gates in the particular switching network SN1—SN4 that has been enabled by depression of one of the document selector buttons DS1—DS4. Thus, when the first document selector button DS1 is depressed, for example, it closes a switch S1 (FIG. 13) which in turn enables the first switching network SN1. More specifically, the closing of switch S1 applies an input signal to each of eight AND gates 104a, b; 105a, b; 106a, b; and 107a, b in the switching network SN1, thereby opening those gates to pass the respective signals derived from the selected counter output terminals. In other words, each of the gates 104a, b—107a, b produces an output signal only when both of the selected units and tens signals from the counter 102 are present along with the enabling signal produced by the closing of the switch S1.

As can be seen from the program panel terminals connected to the inputs to the switching network SN1 in FIG. 13, each of the four gate pairs 104a,b; 105a,b; 106a,b; and 107a,b represents one of the four fields that can be selected for reading on the first document. Thus, gates 104a,b represent the start and stop limits for field 1 (in terms of sprocket spaces from the leading edge of the document); gates 105a,b represent the start and stop limits for field 2; gates 106a,b represent the limits for field 3; and gates 107a,b represent the limits for field 4. For example, if the first field is defined as the area between sprocket holes 1 and 9, as in the example described above, the first gate 104a, which represents the start of field 1, produces an output only when the counter 102 produces output signals on units terminal 1 and tens terminal 0. Similarly, the second gate 104b, which represents the end of fields 1, produces an output only when the counter produces output signals on units terminal 9 and tens terminal 0. The other gate pairs 105a,b; 106a,b; and 107a,b operate in a similar manner. It will be appreciated that output signals will never be produced by two of the gates at the same time, because the start and stop limits of the four fields are always spaced along the length of the document, so each selected field limit will be represented by a different sprocket count.

In order to provide a continuous output signal during each field interval, i.e., between the successive outputs of the two gates in each pair 104a,b—107a,b, the four gate pairs are connected to four flip-flops 108—111. Since flip-flops are well known to those skilled in the art, they will not be described herein in detail. Rather, the flip-flops have been illustrated symbolically as having a "set" section S and a "reset" section R with a junction therebetween. It will be understood that when an input signal or pulse is applied to the S side of the flip-flop, it is switched from a first stable state to a second stable state so as to produce a predetermined output signal which continues until the flip-flop is reset from the second state back to the first state by the application of a signal to the R side.

Upon application of the output signal from the "field 1 start" gate 104a to the S side of the first flip-flop 108, the flip-flop produces an output signal which is utilized to enable a selected matrix of photocells in the reading head until an output signal is produced by the "field 1 stop" gate 104b. In other words, the output signal from the flip-flop 108 continues only until the flip-flop is reset by an output signal from the "field 1 stop" gate 104b, which signal is applied to the R side of the flip-flop 108 in response to a preselected pair of output signals from the counter 102 representing the end of the first field as defined by the program panel connections (to terminals K-1, L-1). Thus in the example given previously, the end of field 1 on document number 1 is reached when counter output signals appear at units terminal 9 and tens terminal 0, which are the two terminals connected via the program panel to the "field 1 stop" gate 104b. When both of these signals from the counter 102 are present at the gate 104b, an output signal is produced and fed through an OR gate 112 (to be described in more detail below) to reset the flip-flop 108. Consequently, it can be seen that the output signal from the flip-flop 108 is produced only between the two limits of the first field as defined by the program panel connections. In the particular example given above, the output signal from the flip-flop 108 would be produced only from count 1 to count 9 of the counter 102, i.e., between sprocket holes 1 and 9 as counted from the leading edge of the document being read.

The OR gate 112 mentioned above, as well as similar OR gates 113, 114, and 115 (FIG. 13) connected in the output lines from gates 105b, 106b, and 107b, respectively, are utilized to reset the flip-flops 108—111 each time a new document is fed into the reading system. Since OR gates are well known to those skilled in the art, they will not be described herein in detail. Rather, OR gates will be illustrated symbolically by the particular symbol utilized to represent the OR gates 112—115 in FIG. 13. It will be understood that an OR gate produces a predetermined output signal when any one input signal is present. Thus, the OR gates 112—115 produce output signals to reset the flip-flops 108—111, respectively, in response to input signals derived from either the AND gates 104b—107b or a reset line 116.

Returning now to the output signal from the flip-flop 108 this signal is applied via the program panel connections (terminal I, 17 to terminal F, 17) to an AND gate 120 (FIG. 12) corresponding to the "R gate" in FIG. 11. The purpose of this signal is to open the gate 120 to permit the particular matrix of photocells required to read the R code to be enabled while the first field, e.g., the space between sprocket holes 1 and 9, is passing the reading head. It will be understood that the signal applied to the gate 120 does not continuously enable the R code matrix of photocells, but rather conditions the gate 120 to enable such cells in response to intermittent signals produced by the synchronizing photocell PCR when each individual character field within the selected reading field is in full registry with the selected cells. Accordingly, the AND gate 120 does not produce a continuous output signal for the entire duration of the signal from the flip-flop 108, but only when it also receives an input signal from the synchronizing photocell PCR. Consequently, the output of the AND gate 120 enables the selected R code reading cells PC6, PC8, PC10, PC15 and PCc only when both (1) a selected code field is passing the reading head and (2) one of the individual character fields within the selected code field is in full registry with the R code cell matrix.

As mentioned previously, the photocells PC6, PC15 and PCc are required for each of the three PF codes R, RR, and IL, and thus these three cells are enabled through a circuit different from that which is utilized to enable the other two cells PC8 and PC10. More particularly, to enable cells PC6, PC15 and PCc, the output signal from the AND gate 120 is passed through an OR gate 121 and applied to three separate AND gates A6, A15, and Ac connected to the corresponding photocells PC6, PC15 and Pc. Consequently, the gates A6, A15, and Ac are conditioned to pass any signals generated by the corresponding cells PC6, PC15, and PCc during the reading interval when the AND gate 120 also produces an output. To enable the other two photocells required for the R code reading matrix, namely cells PC8 and PC10, the output signal from the AND gate 120 is applied directly to AND gates A8 and A10 connected to the corresponding photocells PC8 and PC10, so as to condition these two gates to pass any signals generated by the cells PC8 and PC10 during the reading interval.

As explained previously, the particular combination of signals transmitted through the AND gates A6, A8, A10, A15 and Ac during each reading interval provide an electrical representation of the particular character present at the reading head at the time such signals are generated by the reading photocells. For example, if the character "1" were present, output signals would be generated by cells PC8 and PCc and transmitted through gates A8 and Ac, since positions 8 and c are the significant locations for the character "1" in the 3 × 16 matrix for the R code (FIGS. 2 and 3). From the AND gates, these signals are fed into a buffer register comprising an array of five flip-flops FF6, FF8, FF10, FF15 and FFc. These five flip-flops serve as an intermediate storage means to store the character-representing signals for application to a suitable decoding device (not shown). More specifically, a signal transmitted through any of the five AND gates A6, A8, A10, A15 or Ac sets the corresponding flip-flop FF6, FF8, FF10, FF15 or FF c, which then remains in the set condition until it is reset by the output signal from a delay network 122. The delay network is actuated by the input signal to any of the flip-flops FF6—FFc via an OR gate 123; at a predetermined delay time interval after the last signal from the OR gate 124, the delay network 122 produces an output signal which resets those flip-flops FF6—FFc which were previously set. The purpose of the delay interval is to provide time for the signals stored in the flip-flops FF6—FFc to be read out after the transmission of the last input signal thereto. IT It will be understood that the delay interval must be shorter than the time interval between the reading of adjacent character fields, so that the buffer register flip-flops are always reset between the reading of successive characters.

Thus far, the operation of the illustrative embodiment of the present invention has been described only with reference to the reading of an R code in a first field of a first document. It will be understood, however, that the programming and reading of the same code in other fields on the same document is performed in a similar manner. Thus, referring to the program panel illustrated in FIG. 10, the start and stop limits for the second field on the first document are selected by connecting the document 1, field 2 start terminals I-J, 1 and the corresponding stop terminals K-L, 2, to selected sprocket count terminals M—O, 1—20. These connections select the particular counter output terminals 103 to be connected to he document 1, field 2 start and stop gates 105a and 105b in FIG. 13, and the signals transmitted through these gates 105a and 105b cause an output signal to be produced by a slip flip-flop 109 for a prescribed time interval corresponding to the interval between the selected counter inputs. Still assuming it is an R code which is being read in the second field, the output from the flip-flop 109 is applied by a program panel connection (I, 18 to F, 17) to the gate 120, and the operation of the balance of the system is the same as that described previously in connection with the first field of the same document.

The operation of the illustrative system is also similar for the other three documents that can be programmed on the same program panel utilized to program the system for the first document. Thus, assuming that the second document still has only PF codes to be read, one of the document 2 terminals H—J, 21 is connected to one of the PF terminals I—L, 22, to open the gate 101 and thereby condition the counter 102 to count sprocket holes in response to signals from the sprocket counting photocell PCS. The start and stop limits for the various fields to be read on the second document are selected by connecting the document 2 field terminals I—L, 5—8 to selected sprocket count terminals M—O, 1—20 in the same manner described above for the document 1 field terminals I—L, 1—4. If the particular species of PF code to be read on the second document is again the R code, the appropriate document 2 field exit terminals J, 17—20 connected to the R terminal F, 17 to condition the reading system to read the R code in the selected document 2 fields.

When the operator wishes to read document number 2, he simply depresses the second document selector button DS2 so as to close switch S2 in FIG. 13. The closing of switch S2 performs the same function as the closing of switch S1 described previously, except that the switching network that is enabled in this case is SN2 rather than SN1. Thus, the counter output terminals 103 selected to define the various fields in document number 2 are connected to AND gates 204a, b; 205a, b; 206a, b; and 207a, b via the program panel connections described above, so as to produce corresponding output signals from flip-flops 208, 209, 210 and 211. Still assuming that the particular species of PF code to be read is the R code, the output signals from the flip-flops 208—211 are applied to the R code AND gate 120, and the operation of the balance of the system is the same as that described previously for the first document.

The operation of the illustrative system is the same for the third and fourth documents that can be programmed on the same program panel used for documents 1 and 2. Thus, still assuming only PF codes are to be read, the document 3 terminals K—M, 21 and the document 4 terminals N—P, 21 are connected to the PF code terminals I—L, 22. The fields for the third and fourth documents are defined by connecting terminals I—L, 9—12, for document number 3, and the terminals I—L, 13—16, for document number 4, to selected sprocket count terminals M—O, 1—20. The field exit terminals for the third and fourth documents, namely terminals I—L, 19 and I—L, 20, respectively, are connected to the R code terminal F, 17, still assuming that the particular species of PF code to be read is the R code. When the operator wishes to read the third or fourth document, he depresses document selector button DS3 or DS4, which in turn closes the corresponding switch S3 or S4 shown in FIG. 13. The switches are operatively connected to third and fourth switching networks SN3 and SN4 (shown in block form only in FIG. 13) similar to the two switching networks SN1 and SN2 already described.

Turning now to the other codes, if it is desired to read a PF code other than the R code, namely the RR or IL code the code, the program panel connections are all the same as those described above with one exception, namely the field exit terminals I—L, 17—20 are connected to the RR terminal F,18 or the IL terminals F, 19—20 rather than the R terminal F,17. This causes the output signals from the switching networks SN1 through SN4 to be applied to either an RR AND gate 130 (FIG. 12), in the case of the RR code, or directly to the OR gate 121, in the case of the IL code. Referring first to the RR gate 130, the operation of this gate is similar to the R gate 120 described previously except that the output from the gate 130 is used to enable photocells PC6, PC8', PC10', PC15 and PCc, which is the matrix of photocells corresponding to the significant positions of the indicia representing the RR code characters. The three cells which are common to the cell matrix for the R code, namely cells PC6, PC15 and PCc, are enabled in the same manner described previously for the R gate 120, i.e., the output from the gate 130 is fed to the OR gate 121 associated with the three cells PC6, PC15 and PCc. To enable the other two cells, PC8' and PC10', the output from the RR gate 130 is applied directly to AND gates A8' and A10' connected to the corresponding photocells PC8' and PC10'. Consequently, the gates A8' and A10' are conditioned to pass any signals generated by the two cells PC8', PC10' during the reading interval.

In order to enable the matrix of reading cells for the RR code only when one of the individual character fields within the selected reading field is in full registry with the reading cells, the gate 130 enables the RR matrix of cells only in response to signals from the sprocket synchronizing photocell PCRR in the reading head. As in the case of the R code sprocket synchronizing cell PCR, the call PCRR is offset from the center line of the RR code matrix of reading cells by a distance equal to the radius of one sprocket hole, and the output signal utilized from the cell PCRR is that produced at the trailing edge of the sprocket hole. This output signal enables the reading matrix of cells PC6, PC8', PC10', PC15 and PCc just as the individual character field comes into full registry with the reading matrix. As soon as the character field has advanced past the reading matrix, the RR reading matrix is disabled until the next sprocket hole 26 arrives at the cell PCRR.

The output signals generated by the cells PC6, PC8', PC10', PC15 and PCc in response to the RR code indicia are passed through the corresponding gates A6, A8', A10', A15 and Ac into the buffer register comprising the flip-flops FF6—FFc in the same manner described previously for the output signals generated by the R code reading matrix. Accordingly, the operation of the balance of the system is the same as that described previously for the R code.

As mentioned previously, when an IL code is to be read, the program panel connections cause the output signals from the switching networks SN1 to SN4 to be applied directly to the OR gate 121 via the IL terminal F,19. Consequently, the three IL code reading cells which are common to reading cell matrix for the R code, namely cells PC6, PC15 and PCc, are enabled in the same manner described previously. The other two cells required for the IL code reading matrix, namely cells PC9 and PC12, are enabled by application of the output signals from the switching networks SN1—SN4 directly from the IL terminal F,19 to AND gates A9 and A12 associated with the corresponding photocells PC9 and PC12. Consequently, the gates A9 and A12 are conditioned to pass any signals generated by the two cells PC9 and PC12 during the reading interval.

It should be noted that there is no sprocket synchronizing signal involved in the IL reading system, because the IL code is "self-sprocketing." That is, each character in the IL code is represented by the indicia in a single column, so it is necessary to read the indicia in each successive column within any given field, rather than reading the indicia in each successive column within any given field, rather than reading the indicia in column groups as in the case of the plural-line R and RR codes discussed previously. In other words, the matrix of reading cells for the IL code are enabled continuously throughout a prescribed field, and the flip-flops FF6—FFc in the buffer register are automatically reset between the reading of successive columns via the OR gate 123 and delay network 122 described previously.

Figure 14:
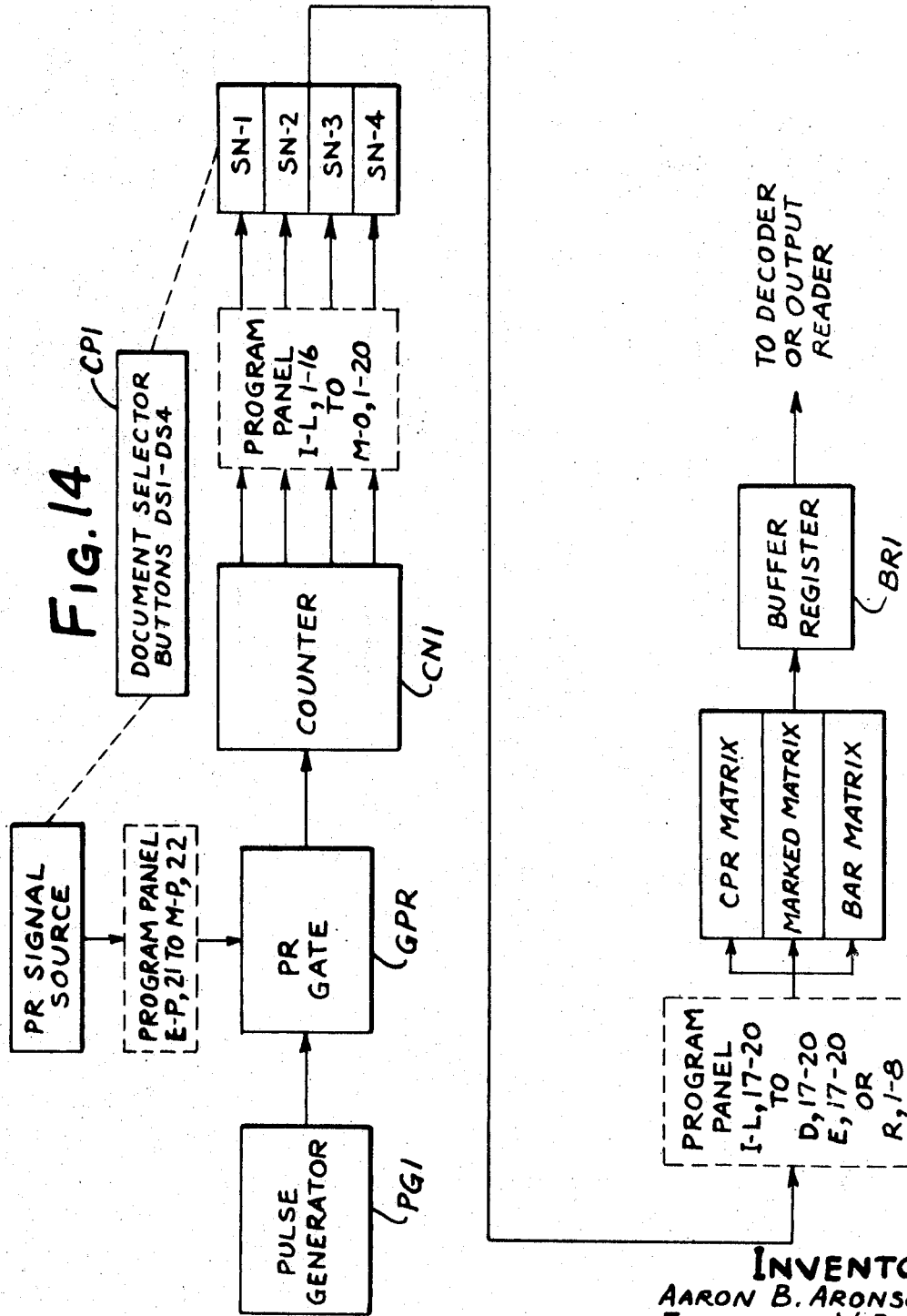
FIG. 14 is a diagrammatic block and line diagram of the electrical components utilized to read reflective codes in the reading system of the invention.

D. programming and reading PR Codes—FIGS. 10 and 14. The system for reading the PR codes is illustrated in block diagram form in FIG. 14. The program panel connections are made of the same panel illustrated in FIG. 10, so that the same panel can be used to program the system for reading either PF codes or PR codes. As in the case of the PF codes, the operation of the illustrative system in reading PR codes can be most easily understood by reference to particular examples. Thus, assuming that a PR code is to be read in the first field of the first document, one of the document 1 terminals E—G, 21 is connected to one of the interconnected PR code terminals M—P, 22 rather than the PF terminals I—L, 22. This connection causes a "PR" signal to be applied to a gate GPR (FIG. 14) so as to open the gate to pass signals from a pulse generator PG1 to the counter CN1. The pulse generator PG1 is operatively connected to the document carrying drum 35 so as to generate pulses at intervals corresponding to 0.1-inch increments of document movement around the drum. Accordingly, when a PR code is being read, the counter CN1 tracks the progress of the document around the drum in terms of 0.1-inch increments of document movement, rather than in terms of sprocket holes, so that the code fields can be selected in approximate multiples of the spaces between the PR code indicia. Thus, the indicia for the CPR and marked codes have a center-to-center spacing of 0.1 inch, while the bar code indicia have a center-to-center spacing of 0.1428 inch. Since the 0.1-inch increments counted by the counter CN1 correspond exactly to the spaces between the CPR and marked code indicia, and represent about two-thirds of the space between adjacent bar code indicia, a field for any of the three PR codes can be conveniently selected in terms of 0.1-inch spaces from the leading edge of a document. In the case of the bar code, the programmer simply allows three 0.1-inch spaces (0.3) for each pair of indicia (0.2856).

The longitudinal start and stop limits of the si fields w in which the PR codes are to be read are selected on the program panel shown in FIG. 10 in the same manner described previously for the PF codes, with one exception. Thus, the numerals representing the number of 0.1-inch spaces between the leading edge of the document and the limits of the field to be read are selected by connecting the terminals I—L, 1—16 to the numerical counter output terminals M—O, 1—20, in the same manner described previously for the PF codes. The only difference is in the connection of the field exit terminals I—L, 17, 20, which in this case are connected to either the marked code terminals D, 17—20; the bar code terminals E, 17—20; or the CPR code terminals R, 1—8, depending upon which of the three species of PR codes is to be read in the selected field. These connections cause the output signals from the switching networks SN1—SN4 to enable appropriate matrices of reading cells in the PR reading head, as will be described in more detail in connection with the preferred embodiment to be discussed below.

In accordance with one important aspect of the present invention, the field selection means includes means for actuating the reading head to automatically read the indicia in fields prescribed by indicia locations in the direction transverse to the direction of indicia movement, as well as in the direction of indicia movement. Thus, in the case of the CPR code, it is necessary to define not only the longitudinal start and stop limits of the fields to be read, but also the particular lines on which the code is to be read. As described previously, the CPR code may be printed on any combination of five different lines selected from a total of 11 printing lines, at the option of the programmer. Accordingly, the system must be programmed to read only the five lines on which the one code indicia have been printed, since other printed matter may be printed on the other lines. For this purpose, one of four groups of five "reading line" terminals P, 1—5 (document 1); P, 6—10 (document 2); P, 11—15 (document 3); or P, 16—22 (document 4), corresponding to the particular document on which the CPR code is to read, must be connected to selected line terminals Q, 1—22 corresponding to the 11 available printing lines.

Returning to FIG. 14, the field definition connections on the program panel cause selected output signals from the counter CN1 to be applied to one of a plurality of switching networks SN1 through SN4 corresponding to the four documents programmed on any given panel. For example, if the defined field is for the first document, the program panel connections from the document 1 field terminals I—L, 1—4 to selected counter output terminals 1—20, M—O couple the selected counter outputs to the first switching network SN1. Then whenever the first document selector button DS1 on the control panel CP1 is depressed, switching network SN1 is enabled so as to condition the reading head to read the particular field or fields selected for the first document.

The connections described thus far in connection with FIG. 14, program the system to read a PR code in prescribed fields defined on the program panel. Since the illustrative system is designed to read any of three different PR codes, namely the CPR code, the marked code, and the bar code, it is also necessary to condition the reading head to read only the particular species of PR code to be used in the prescribed fields. For this purpose, the field exit terminals I—L, 17—20 corresponding to the selected fields are connected to either marked code terminals D, 17—20, bar code terminals E, 17—20, or CPR code terminals R, 1—8. For example, if the particular species of PR code to be read in field 1, document 1 is the CPR code, the field exit terminal I, 17 is connected to one of the CPR code terminals R, 1—8. Referring to FIG. 14, this connection would cause the switching network SN1 to be coupled to the CPR matrix of reading cells in the PR reading head, thereby enabling only the CPR matrix during the field 1, document 1 reading interval. More particularly, the switching network SN1 would be operatively connected to five of the cells PCL1, PCL4, and PCL6—PCL14, which are the 11 cells used to read the CPR code indicia. Similarly, connection of one of the field exit terminals I—L, 17—20 to one of the marked code terminals D, 17—20 would enable only the marked code reading cells PCL4 and PCL6—PCL14, while connection to one of the bar code terminals E, 17—20 would enable only the bar code reading cells PCL1—PCL5.

While the reading cells in the selected code matrix are enabled, they produce a combination of output signals corresponding to the indicia pattern occurring in the particular character field being read. These output signals from the reading photocells are fed into a buffer register BR1 which serves as an intermediate storage means to store the signals from the photocells for application to a suitable decoding device (not shown), in the same manner described previously in connection with FIGS. 11—13.

It will be appreciated that no synchronizing function is required for the reading of the PR codes, because each character in the PR codes is represented by a single line of indicia, similar to the IL code described previously. Consequently, the cells are enabled continuously throughout the reading interval for any given field. If desired, additional gating could be provided to disable the cells between successive PR code indicia so that the PR reading head would, in effect, ignore the space between successive indicia, thereby further reducing the possibility of spurious readings.

E. Detailed Description Of An Exemplary PR Code Reading System—FIGS. 12, 13, 15 and 16. Referring now to FIGS. 12-—13 and 15—16 for a more detailed description of a preferred embodiment of the PR code reading system previously described and illustrated in block diagram form in FIG. 14, signals produced by a 0.11-inch interval pulse generator 400 are fed through an AND gate 401 to the document position counter 102. As described previously, the pulse generator 400 is connected to the document carrying drum 35 so as to generate the repetitive output signals in response to progressive 0.1-inch increments of document movement around the drum. Assuming for the moment that the reading system has been programmed via the program panel to read a PR code in only the first field of the first document, the signals from the pulse generator 400 will not be passed through the AND gate 401 until the operator has depressed the document selector button DS1 so as to close the switch S1 (FIG. 13). The closing of the switch S1 applies a PR signal to the gate 401 (via program panel connection E—G, 21 to M—P, 22) thereby opening the gate 401 to pass the signals from the pulse generator 400 to the counter 102. As long as the AND gate 401 is maintained open by the PR signal, i.e., as long as the switch S1 remains closed, the counter 102 continues to count the self-sprocketing signals from the generator 400 so that the count stored therein at any given time represents the number of 0.1-inch increments of document movement past the reading head, starting at the leading edge of the document.

The longitudinal limits of the particular fields in which the PR codes are to be read are selected in the same manner described previously in connection with the PF code fields. That is, the field definition connections on the program panel cause selected output signals from the counter 102 to be applied to the switching networks SN1—SN4. Consequently, each time a selected pair of counter output signals appears at the counter terminals 103, they are applied via the program panel connections M—O, 1—20 to I—L, 1—16 to a selected pair of gates in the particular switching network SN1—SN4 that has been enabled by depression on one of the document selector buttons DS1—DS4. For example, when the first document selector button DS1 is depressed as in the example given above it closes the switch S1 to enable the first switching network SN1. The various gates 104a,b; 105a,b; 106a,b; and 107a,b in the enabled switching network SN1 then respond to the selected counter output signals to set and reset the corresponding flip-flops 108 through 111 to provide output signals corresponding to the selected field intervals.

Whereas the output signals from the switching network SN1 were applied to one of the PF code terminals F, 17—20 in the case of the PF code, these same signals are applied to terminals D, 17—20 for the marked code, terminals E, 17—20 for the bar code, and terminals R, 1—8 for the CPR code.

Figure 15:
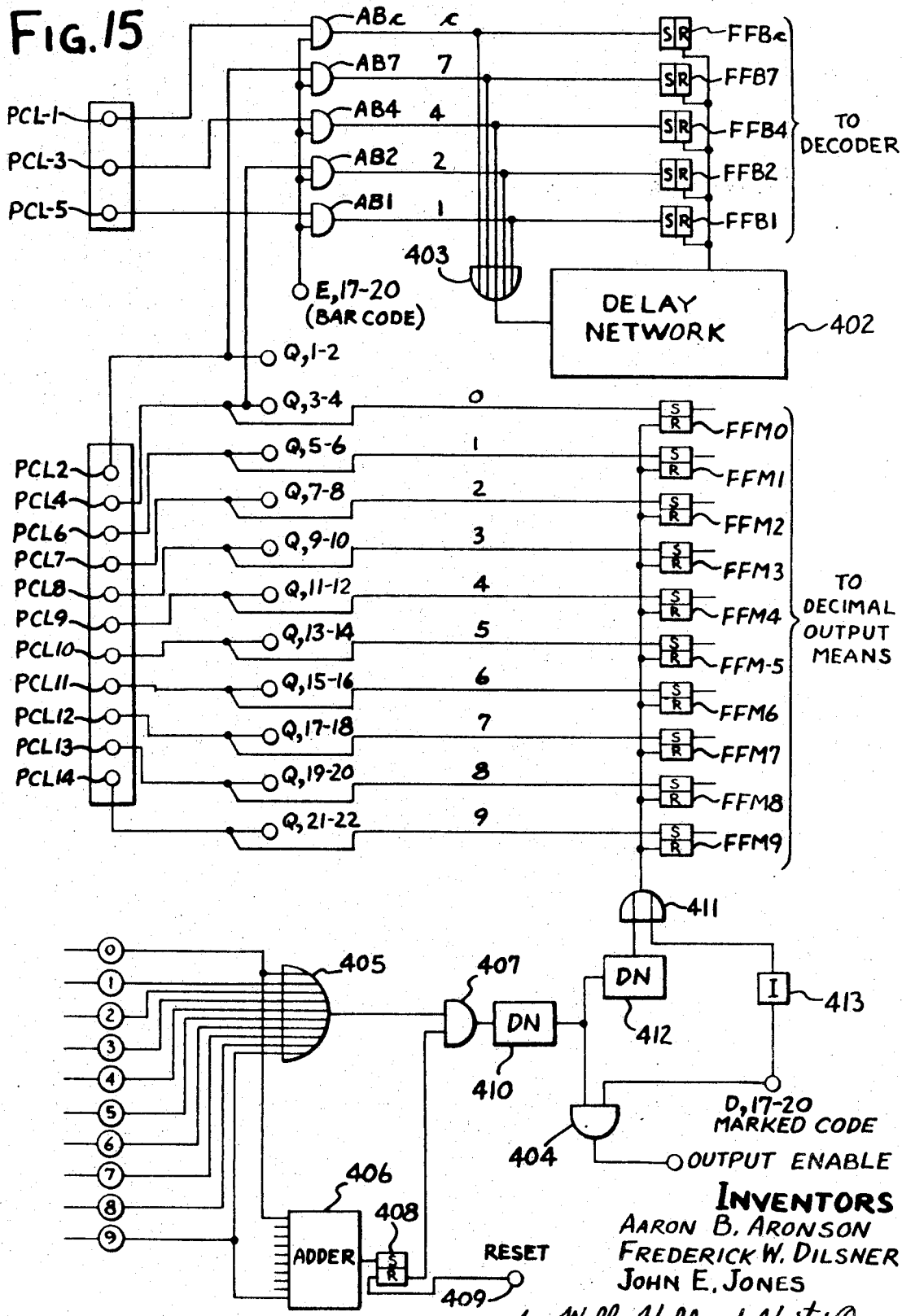
FIG. 15 is a detailed block diagram of certain of the components shown in FIG. 14.

Referring first to the bar code reading system, which is illustrated in FIG. 15, the application of a switching network output signal to the bar code terminals E, 17—20 opens a group of five AND gates AB6, AB7, AB4, AB2, and AB1 so as to enable the corresponding matrix of photocells PCL1—PCL5, which are the particular cells required to read the bar code in the PR reading head. More particularly, the opening of AND gate ABc enables cell PCL1 corresponding to the c level of the bar code, the opening of gate AB7 enables cell PCL2 corresponding to the 7 level of the bar code, the opening of gate AB4 enables cell PCL3 corresponding to the 4 level of the bar code, the opening of gate AB2 enables cell PCL4 corresponding to the 2 level of the bar code, and the opening of gate AB1 enables cell PCL5 corresponding to the 1 level of the bar code. As mentioned previously, the selected cells PCL1- —PCL5 are enabled continuously throughout the reading interval determined by the signal from the switching networks SN1—SN4 since each character in the PR codes is represented by a single line of indicia, i.e., the PR codes are, in effect, self-sprocketing.

The particular combination of signals transmitted through the AND gates ABc, AB7, AB4, AB2, and AB1 during each reading interval provides an electrical representation of the particular characters present in the prescribed field. For example, if the character "1" were present in one of the columns of the prescribed field, output signals would be generated by cells PC1 and PC5 and transmitted through gates ABc and AB1, since indicia are located at the c level and the 1 level to represent the character "1" in the bar code. From the AND gates, the signals are fed into a buffer register comprising an array of five flip-flops FFBc, FFB7, FFB4, FFB2, and FFB1 (FIG. 15). As in the case of the buffer register described previously in connection with FIG. 12, these five flip-flops serve as an intermediate storage means to store the character-representing signals for application to a suitable decoding device (not shown). More specifically, a signal transmitted through any of the five AND gates ABc, AB7, AB4, AB2, or AB1 sets the corresponding flip-flop, which then remains in the set condition until it is reset by an output signal from a delay network 402. The delay network is actuated by the input signal to any of the flip-flops FFBc—FFB1 via an OR gate 403; at a predetermined delay time interval after the last signal from the OR gate 403, the delay network 402 produces an output signal which resets those flip-flops which were previously set. It will be understood that this delay interval must be long enough to permit the signals stored in the flip-flops FFBc- —FFB1 to be read out after the transmission of the last input signal, but the interval must also be shorter than the time interval between the reading of adjacent character columns in any given field so that the flip-flops in the buffer register are reset between the reading of successive columns.

In reading the marked code, the field selection is effected in the same manner described above in connection with the bar code. That is, the connection of one of the document selection terminals E—P, 21 to one of the PR code terminals M—P, 22 causes the PR signal to be automatically applied to the AND gate 401 when the corresponding document selector button DS1—DS4 is depressed, and the field start and stop limits are selected by connecting the field definition terminals I—L, 1- —16 to selected counter output terminals M—O, 1—20. The two systems are also similar in that the resulting output signals from the switching networks SN1—SN4 are again utilized to enable the particular matrix of photocells required to read the marked code in the PR reading head. In this case, the required matrix of photocells comprises cells PCL4 and PCL6- —PCL14, which are the 10 cells located at the 10 levels of the marked code indicia.

It will be appreciated that the signals generated by the reading matrix for the marked code actually provide a decimal representation of the particular characters present at the reading head at the time such signals are generated, because the marked code is itself in decimal form rather than binary form. The marked code is also unique in that one and only one mark must be present in each column in order to provide an accurate representation of any given character that is, the absence of any marks in a given column, or the presence of two or more marks in the same column, indicates that there is an error in the code. Because of the decimal nature of the signals generated by the photocells in the marked code reading matrix, the signals are applied directly to a series of flip-flops FFM0—FFM9, the outputs of which are connected to a conventional decimal output means (not shown). For reasons which will become apparent from the ensuing description, the enabling signal from the switching networks SN1—SN4 is utilized to enable the decimal output means connected to the flip-flops FFM0—FFM9, rather than controlling the passage of the signals from the reading photocells to the flip-flops. More particularly, the marked code terminals D, 17—20 which receive the output signals from the switching networks SN1- —SN4, are connected to one input to an AND gate 404, the output of which enables the decimal output means connected to the flip-flops FFM0—FFM9. In other words, regardless of what signals are transmitted to the flip-flops FFM0—FFM9, the decimal output means is not enabled to receive output signals from the flip-flops FFM0—FFM9 unless an output signal is also produced by the AND gate 404.

The second input to the AND gate 404 indicates whether there is one and only one mark present in any given indicia column in the marked code fields selected by the other input from the switching networks SN1—SN4. The output signals generated by the matrix of reading cells for the marked code (cells PCL4 and PCL6—PCL14) are fed to an OR gate 405 and an adder 406, the outputs of which are connected to an AND gate 407. (For purposes of clarity, the 10 input lines to the OR gate 405 in FIG. 15 have not been connected to the 10 output lines from the reading photocells PCL4 and PCL6- —PCL14, but have simply been labeled 0, 1, etc. to represent such connections symbolically. Similarly, only the 0 and 9 inputs have been shown for the adder 406, it being understood that the eight intervening inputs are connected to the lines labeled 1 to 8 from photocells PCL6—PCL13, respectively). The output of the AND gate 407 is, in turn, connected to the second input to the "output enabling" AND gate 404. supplied with at least one input signal from the reading photocells PCL4 and PCL6—PCL14, it can be seen that the AND gate 407 does not produce an output unless an output signal has been generated by at least one of the 10 reading photocells, thereby indicating that there is at least one mark present in the particular column being read at that time. The adder 406 completes the checking function by determining whether there are two or more marks in any given column. Thus, as long as there are less then two marks present in a given column, a flip-flop 408 connected to the output of adder 406 is maintained in its reset state, thereby producing an output signal which is applied to the second input to the AND gate 407. When both input signals are present, the AND gate 407 responds by producing an output signal. If the number of marks sensed in any given column is two or more, however, the adder 406 sets the flip-flop 408, so that the only input signal applied to the AND gate 407 is that derived from the OR gate 405. In this case, the AND gate 407 does not produce an output signal.

Consequently, it can bee seen that the AND gate 407 produces an output signal only when there is one and only one mark present in any given column. More particularly, the OR gate 405 determines when there is more than one mark, and the AND gate 407 responds to the corresponding output signals from the OR gate 405 and the adder 406 to produce an output signal only when there is one and only one mark present. The output from the AND gate 407 is passed through a delay network (DN) 410 to the "output enabling" AND gate 404, which receives its other input from the switching networks SN1—SN4 as described previously. Thus, it can be seen that the decimal output means will be enabled (via the output from AND gate 404) only when (1) a selected marked code field is present at the reading head, as determined by the signals from the switching networks SN1—SN4, and (2) there is one and only one mark present in each column of marked code indicia within the selected field. In the event that more than one mark is detected in any column within a selected field, the decimal output means is disabled for the remainder of the reading interval for that field. Thus, if the adder 406 ever produces an output signal to set the flip-flop 408, the flip-flop remains in the set state until the end of that particular field, at which time a reset signal is applied to the flip-flop 408 from a terminal 409.

In order to insure that the decimal output means is not enabled to read out a character-representing signal before such signal has set one of the flip-flops FFM0—FFM9, the output signal from the AND gate 407 is passed through the delay network 410 before it is applied to the output enabling AND gate 404. In addition to supplying one of the two input signals to the AND gate 404, the output from the AND gate 407 also resets the flip-flop FFM0—FFM9, between successive character readings. More specifically, the output signal from the delay network 410 is passed through a second delay network 412, and then on through an OR gate 411 to the reset input of each of the flip-flops FFM0—FFM9. The delay network 412 insures that the particular flip-flops that has been set by the reading photocells, is not reset before the decimal output means has been enabled to read out the stored signal.

In the event that two or more marks are sensed in any given column within a prescribed marked code field, the AND gate 407 cannot produce any further output signals for the remainder of the reading interval for that particular field, due to the action of the adder 406 and flip-flop 408 described above. Consequently, the output from the AND gate 407 cannot be utilized to reset the flip-flops FFM0—FFM9 whenever such an abortive reading is encountered and, therefore, cannot be relied upon to reset the flip-flops FFM0—FFM9 at the end of each field. Accordingly, the field definition signal from the marked code terminals D, 17-13 20 (FIG. 15) is fed through an inverter 413 and the OR gate 411 to the reset input of each of the flip-flops FFM0—FFM9. Because this signal is passed through the inverter 413, it has no effect on the flip-flops FFM0—FFM9 at the start of the reading interval, but functions to reset such flip-flops at the end of the reading interval.

As mentioned previously, the computer printed code CPR has only five levels of indicia, but these five levels may be selected from any of 11 different printing lines on the record medium. Accordingly, when the particular species of PR code to be read is the CPR code, the field to be read must be defined not only by longitudinal start and stop limits, but also by the numbers of the lines on which the indicia are to appear. The longitudinal start and stop limits are selected in the same manner described previously for the other codes, namely, by connecting the field start and stop terminals I—L, 1—20 to selected counter output terminals M—O, 1—20. The particular lines on which the CPR code indicia are to be read are selected by connecting selected terminals P,1—20, which represent the five significant levels to be read on each of the four documents that can be programmed on a single panel, to line selection terminals Q,1—22, which represent the 11 available printing lines on each document. More specifically, terminals P,1—5 represent the 1, 2, 4, 8, and c levels of the CPR code to be read on document number 1; terminals P,6—10 represent the same five levels for document number 2; terminals P,11—15 represent the five levels for document number 3; and terminals P,16—22 represent the five levels for document number 4. Assuming that the indicia for the CPR code are to be printed on lines 4 through 8 of document 1, for example, the five terminals P,1—5 are connected to terminals Q,4; Q,9; Q,11; Q,13; and Q,15, respectively. It will be appreciated that with the particular system illustrated, the CPR code must be read on the same five lines for all fields on a given document. In other words, if the CPR code is to be read on lines 4—8 in the first field of the first document, those same five lines must be employed for the CPR code in any other field on the same document. Of course, codes other than the CPR code may be read in other fields on the same document.

Figure 16:
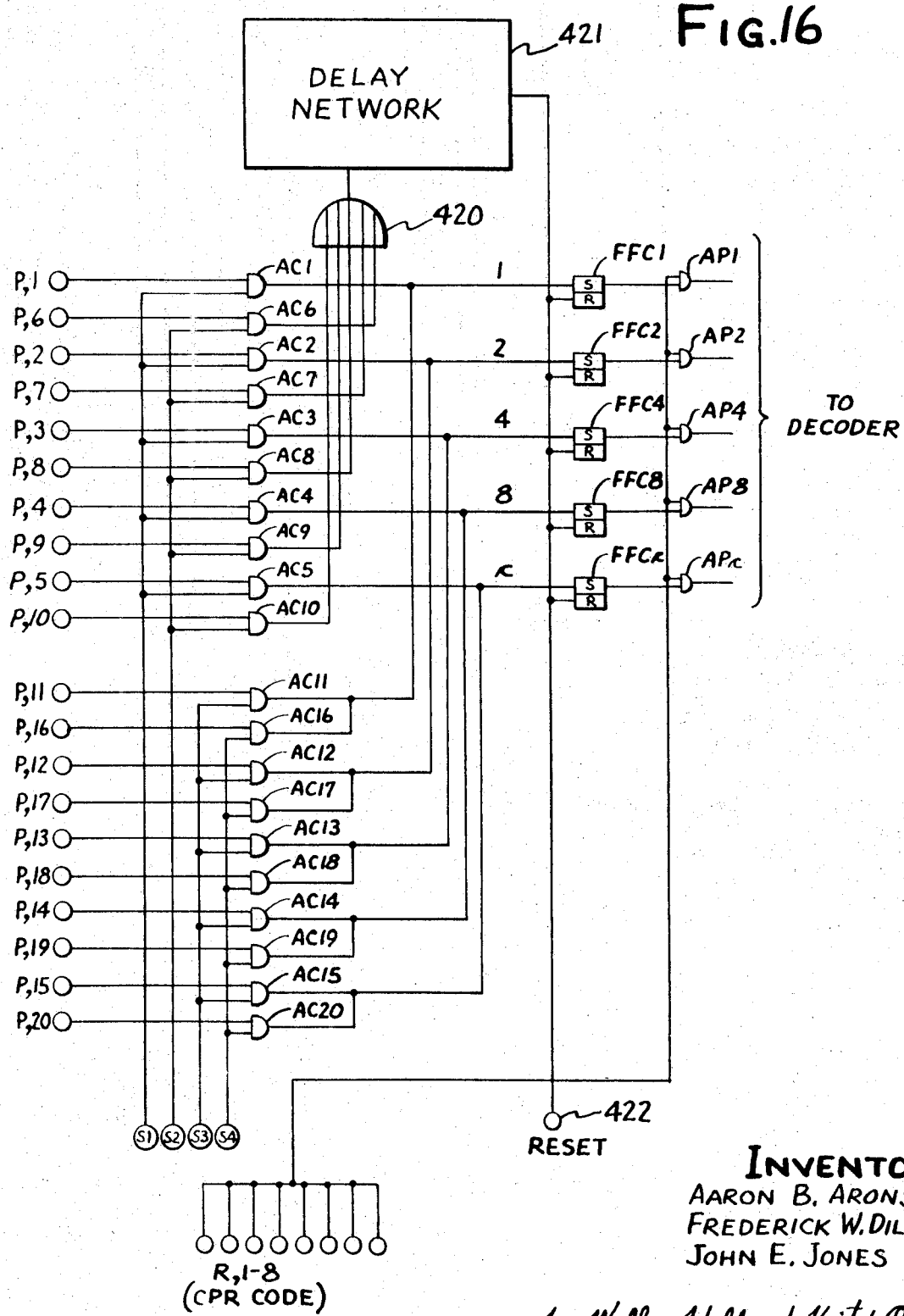
FIG. 16 is a detailed block diagram of other components shown in FIG. 14.

The program panel connections described above (P,1—20 to Q,1—22) select a matrix of five reading cells, corresponding to the five levels on which the indicia for the CPR code are to be printed, for each of the four documents. These cells are selected from the group of 11 cells PCL2, PCL4, and PCL6 through PCL14 in the reflective reading head. The five cells selected for each document on which a CPR code is to be read, are enabled by connecting the same, via the program panel connections (P,1—20 to Q,1—22) to one of four different groups of five AND gates AC1—AC5, AC6—AC10, AC11—AC15, or AC16—AC20 (FIG. 16). Thus, the five cells selected for document 1 are connected to AND gates AC1 through AC5, the cells for document 2 are connected to gates AC6 through AC10, the cells for document 3 are connected to gates AC6 through AC10, the cells for document 3 are connected to gates AC11 through AC15, and the cells selected for document 4 are connected to gates AC16 through AC20. Each time a document selector button DS1—DS4 is depressed, a corresponding switch S1—S4 is closed to apply a CPR signal to one of the four groups of AND gates corresponding to the four different documents. For example, referring to FIG. 16, if switch S1 is closed by depression of document selector switch DS1, a CPR signal is applied to AND gates AC through AC, and, these five gates are then conditioned or opened to pass any signals generated by the selected reading photocells connected thereto. The particular combination of signals transmitted through the selected group of AND gates provides an electrical representation of the particular character present at the reading head at the time such signals are generated by the reading photocells. For example, if the character "1" were present, output signals would be generated by the reading cells corresponding to levels "1" and "c" and transmitted through gates A1 and A5, since positions "1" and "c" are the significant locations for the character "1" in the CPR code.

From the AND gates AC1—AC20, the character-representing signals are passed on to five flip-flops FFC1, FFC2, FFC4, FFC8, and FFCc corresponding to the five levels of the CPR code. Each time an input signal is applied to one of the five flip-flops FFC1 through FFCc, that particular flip-flop is set, thereby producing an output signal which is applied to a corresponding AND gate AP1, AP2, AP4, AP8, or APc associated with a conventional output decoder (not shown).

In order to enable the reading system for the CPR code only during the selected field as defined by the selected counter output signals, the AND gates AP1—APc receiving the output signals from the five flip-flops FFC1 through FFCc are opened only in response to output signals from the switching networks SN1—SN4. Thus, referring back to the exemplary program panel in FIG. 10, the particular field exit terminal 1—L, 17—20 for each field within which a CPR code is to be read, is connected to one of the terminals R,1—8. As can be seen in FIG. 16, this connection causes the output signals from the switching networks SN1—SN4 to be applied to the AND gates AP1—APc associated with the flip-flops FFC1 through FFCc during the reading interval for each field in which a CPR code is to be read, thereby opening those gates to pass the character-representing signals to the decoder.

In order to reset the flip-flops FFC1 through FFCc during the reading of successive columns of CPR indicia, a signal transmitted through any of the 20 AND gates AC1 through AC20 is also passed through an OR gate 420 to actuate a delay network 421. At a predetermined delay time interval after each signal from the OR gate 420, the delay network 421 produces an output signal which resets those flip-flops FFC1 through FFCc which were previously set. It will be understood that the delay interval must be shorter than the time interval between the reading of adjacent columns of CPR indicia, so that the flip-flops FFC1 through FFCc are always reset between the reading of successive columns of CPR code indicia.

F. Resetting the System. For the purpose of resetting the reading system between the reading of successive documents, the leading-edge and trailing-edge sensing photocells PCL and PCT, respectively, are connected via an OR gate 500 (FIG. 12) to a reset terminal 501. As mentioned previously, these two cells PCL and PCT are located outside the reading area 20a of the document 20 to be read, so they produce output signals only in response to the passage of the leading and trailing edges of the document 20 therein, i.e., they are not responsive to the perforated code indicia. Thus, each time the trailing edge of a document passes over the cell PCT, an output signal is generated and passed through the OR gate 500 to the reset terminal 501. From the reset terminal 501, this "reset" signal is applied to several different components of the reading system. More specifically, the reset signal is applied to a reset input 502 to the counter 102, thereby resetting the counter to its zero condition so that it is ready to start a new count for the next document. The reset signal is also applied to the reset terminal 116 in FIG. 13 for passage through the group of four OR gates in each switching network SN1—SN4, such as gates 112-—115 in network SN1, to reset the four corresponding flip flops, such as flip flops 108—111 in SN1. The same reset signal is also applied to the reset terminal 409 in FIG. 15 to reset the flip-flop 408 in the marked code reading system and, finally, to the reset terminal 422 in FIG. 16 to reset the flip-flops FFC1—FFCc in the CPR code reading system.

The signal generated by the other cell PCL performs the same functions described above for the trailing edge cell PCT, but in response to the leading edge of a document instead of the trailing edge. This cell PCL is not necessary during steady state operation of the system, of course, but it is essential to obtain an accurate reading of the first document fed into the system during startup, i.e., when there has been no preceding trailing edge of a document to reset the system via cell PCT.

We claim:

1. A data processing system for automatically reading characters represented by indicia in prescribed fields on record media in any of a plurality of different codes, said system comprising the combination of reading means for producing output signals representing said characters in response to the indicia representing said characters, said reading means including at least one matrix of sensing elements and code selection means for rendering said sensing elements operative and inoperative in different combinations so as to provide said matrix with a plurality of different operative states for responding to said indicia in different codes, means for advancing the indicia for successive characters relatively past said reading means, means responsive to predetermined increments of advancing movement of said record media for continuously tracking the progress of the advancement of said record media relatively past said reading means, and automatic control means operatively connected to said reading means and said tracking means and including means responsive to said tracking means for automatically actuating said reading means at a prescribed first limit of a preselected field on the record media and automatically deactuating said reading means at a prescribed second limit of said preselected field, said automatic control means also including means responsive to said tracking means for rendering only a prescribed combination of said sensing elements operative during the interval when said reading means is actuated whereby said reading means is actuated in a selected operative state to read a corresponding selected code in said preselected field.

2. A data processing system as defined in claim 1 wherein said reading means has a first matrix of sensing elements having a first series of different operative states for responding to said indicia in different perforated codes, and a second matrix of sensing elements having a second series of different operative states for responding to said indicia in different printed or marked codes.

3. A data processing system as defined in claim 1 wherein said automatic control means includes means for actuating said reading means to automatically read the indicia in fields prescribed by limits both in the direction of movement of said indicia relative to said reading means and in the direction transverse to such movement.

4. A data processing system as defined in claim 1 wherein said matrix of sensing elements in said reading means includes a plurality of photoelectric sensing elements spaced along an axis extending transversely to the direction of movement of said indicia relative to said reading means, and said automatic control means includes means for automatically actuating selected combinations of said sensing elements when said reading means is actuated to read the indicia in certain prescribed fields.

5. A data processing system as defined in claim 1 wherein said reading means includes a first matrix of photoelectric sensing elements for responding to perforated indicia and a second matrix of photoelectric sensing elements for responding to printed or marked indicia, each of said first and second matrices having a plurality of different operative states for responding to the respective indicia in different codes, and said automatic control means also includes means for automatically selecting one of said first and second matrices and a prescribed operative state for the selected matrix in response to the actuation of said reading means by said tracking means to read the indicia in a prescribed field.

6. A data processing system as defined in claim 1 wherein said automatic control means also includes record format selection means operatively connected to said tracking means for automatically selecting different prescribed first and second limits for different record formats whereby said reading means is automatically actuated to read the code indicia in different preselected fields for different record formats.

7. A data processing system for automatically reading characters represented by indicia in prescribed fields on record media in any of a plurality of different codes, said system comprising the combination of reading means for producing output signals representing said characters in response to the indicia representing said characters, said reading means including at least one matrix of sensing elements and code selection means for rendering said sensing elements operative and inoperative in different combinations so as to provide said matrix with a plurality of different operative states for responding to said indicia in different codes, means for advancing the record media relatively past said reading means, means responsive to predetermined increments of advancing movement of said record media for continuously tracking the progress of the advancement of said record media relatively past said reading means, and automatic control means operatively connected to said reading means and said tracking means and including means responsive to said tracking means for automatically actuating said reading means at a prescribed first limit of a preselected field on the record media and automatically deactuating said reading means at a prescribed second limit of said preselected field, said automatic control means also including means responsive to said tracking means for rendering only a prescribed combination of said sensing elements operative during the interval when said reading means is situated whereby said reading means is actuated in a selected operative state to read a corresponding selected code in said preselected field, and programming means operatively connected to said automatic control means for preselecting said reading means is actuated, and for preselecting said prescribed combination of sensing elements which are rendered operative for each preselected field, said automatic control means being responsive to both said tracking means and said programming means.

8. A data processing system as defined in claim 7 wherein said programming means also includes field programming means for preselecting said prescribed first and second limits for selected record formats.

9. A data processing system for automatically reading characters represented by indicia in prescribed fields on record media in any of a plurality of different codes, said system comprising the combination of reading means for producing output signals representing said characters in response to the indicia representing said characters, said reading means including a first matrix of sensing elements having a first series of different operative states for responding to said indicia in different perforated codes, and a second matrix of sensing elements having a second series of different operative states for responding to said indicia in different printed or marked codes, means for advancing the indicia for successive characters relatively past said reading means, means responsive to predetermined increments of advancing movement of said record media for continuously tracking the progress of the advancement of said record media relatively past said reading means, and automatic control means operatively connected to said reading means and said tracking means and including means responsive to said tracking means for automatically actuating said reading means at a prescribed first limit of a preselected field on the record media and automatically deactuating said reading means at a prescribed second limit of said preselected field, said automatic control means also including means responsive to said tracking means for rendering only a prescribed combination of said sensing elements operative during the interval when said reading means is actuated whereby said reading means is actuated in a selected operative state to read a corresponding selected code in said preselected field, and record format selection means operatively connected to said tracking means for automatically selecting different prescribed first and second limits for different record formats whereby said reading means is automatically actuated to read the code indicia in different preselected fields for different record formats.

10 A data processing system as defined in claim 9 wherein said reading means includes a first matrix of photoelectric sensing elements for responding to perforated indicia and a second matrix of photoelectric sensing elements for responding to printed or marked indicia, each of said first and second matrices having a plurality of different operative states for responding to the respective indicia in different codes.

11. A data processing system as defined in claim 9 which includes programming means operatively connected to the automatic control means for preselecting said prescribed first and second limits of the preselected field in which said reading means is actuated, and for preselecting said prescribed combination of sensing elements which are rendered operative for each preselected field, said automatic control means being responsive to both said tracking means and said programming means.

12. A data processing method for reading characters represented by indicia in prescribed fields on record media in any of a plurality of different codes, said method comprising the steps of providing a reading station for producing output signals representing said characters in response to the indicia representing such characters, said reading station including at least one matrix of sensing elements and code selection means for rendering said sensing elements operative and inoperative in different combinations so as to provide said matrix with a plurality of different operative states for responding to said indicia in different codes, advancing the indicia for successive characters relatively past said reading station, continuously tracking the advancement of said record media relatively past said reading station in response to predetermined increments of advancing movement of said record media and producing tracking signals representing the progress of said record media, actuating said reading station in response to said tracking signals at a prescribed first limit of a preselected field on the record media and deactuating said reading station in response to said tracking signals at a prescribed second limit of said preselected field, and rendering only a prescribed combination of said sensing elements operative during the interval when said reading means is actuated in a selected operative state to read a corresponding selected code in said preselected field.

13. A data processing method for reading characters represented by indicia in prescribed fields on record media in any of a plurality of different codes, said method comprising the steps of providing a reading station for producing output signals representing said characters in response to the indicia representing such characters, said reading station including at least one matrix of sensing elements and code selection means for rendering said sensing elements operative and inoperative in different combinations so as to provide said matrix with a first series of different operative states for responding to said indicia in different perforated codes, and a second series of different operative states for responding to said indicia in different printed or marked codes, continuously tracking the advancement of said record media relatively past said reading station in response to predetermined increments of advancing movement of said record media and producing tracking signals representing the progress of said record media, actuating said reading station in response to said tracking signals at a prescribed first limit of a preselected field on the record media and deactuating said reading station in response to said tracking signals at a prescribed second limit of said preselected field, and rendering only a prescribed combination of said sensing elements operative during the interval when said reading station is actuated so that the reading station is actuated in a selected operative state to read a corresponding selected code in said preselected field.

14. A data processing method for reading characters represented by indicia in prescribed fields on record media in any of a plurality of different codes, said method comprising the steps of providing a reading station for producing output signals representing said characters in response to the indicia representing such characters, said reading station including at least one matrix of sensing elements and code selection means for rendering said sensing elements operative and inoperative in different combinations so as to provide said matrix with a plurality of different operative states for responding to said indicia in different codes, programming said reading station to preselect prescribed first and second limits of a preselected field in which the reading station is to be actuated, and to preselect a prescribed combination of sensing elements to be rendered operative for each preselected field, advancing the indicia for successive characters relatively past said reading station, and continuously tracking the advancement of said record media relatively past said reading station in response to predetermined increments of advancing movement of said record media and producing tracking signals representing the progress of said record media, actuating said reading station in response to said tracking signals at the prescribed first limit of the preselected field on the record media and deactuating said reading station in response to said tracking signals at the prescribed second limit of said preselected fields, and rendering only the prescribed combination of said sensing elements operative during the interval when said reading station is actuated so that the reading station is actuated in a selected operative state to read a corresponding selected code in said preselected field.

15. A data processing method as set forth in claim 14 wherein said reading station is also programmed to preselect different prescribed first and second limits for different record formats so that the reading station is automatically actuated to read the code indicia in different preselected fields for different record formats.